(12) United States Patent
Roth, II et al.

(10) Patent No.: US 9,182,306 B2
(45) Date of Patent: Nov. 10, 2015

(54) ENVIRONMENTAL SENSOR WITH TENSIONED WIRE EXHIBITING VARYING TRANSMISSION CHARACTERISTICS IN RESPONSE TO ENVIRONMENTAL CONDITIONS

(75) Inventors: Richard Allan Roth, II, Goshen, OH (US); Christopher George Larsen, Cincinnati, OH (US); Stuart James Shelley, Cincinnati, OH (US); Logan Alexander Niehaus, Cincinnati, OH (US)

(73) Assignee: Etegent Technologies, Ltd., Cincinnati, OH (US)

( * ) Notice: Subject to any disclaimer, the term of this patent is extended or adjusted under 35 U.S.C. 154(b) by 832 days.

(21) Appl. No.: 13/166,594

(22) Filed: Jun. 22, 2011

(65) Prior Publication Data

US 2012/0325018 A1 Dec. 27, 2012

(51) Int. Cl.
```
G01L 5/10      (2006.01)
G01L 7/00      (2006.01)
G01L 11/00     (2006.01)
G01L 9/00      (2006.01)
G01L 11/06     (2006.01)
```

(52) U.S. Cl.
CPC .............. *G01L 9/0013* (2013.01); *G01L 11/06* (2013.01)

(58) Field of Classification Search
None
See application file for complete search history.

(56) References Cited

U.S. PATENT DOCUMENTS

| | | |
|---|---|---|
| 2,968,943 A | 1/1961 | Statham |
| 3,071,974 A | 1/1963 | Peterson |
| 3,079,800 A | 3/1963 | Hoar |
| 3,201,735 A | 8/1965 | Brown et al. |
| 3,584,327 A | 6/1971 | Murry et al. |
| 3,915,018 A | 10/1975 | Karplus |
| 4,149,422 A | 4/1979 | Olsen et al. |
| 4,165,651 A | 8/1979 | Olsen et al. |
| 4,165,652 A | 8/1979 | Olsen et al. |
| 4,336,719 A | 6/1982 | Lynnworth |
| 4,414,652 A * | 11/1983 | Crist ............................... 367/93 |
| 4,452,334 A | 6/1984 | Rogers |
| 4,499,438 A | 2/1985 | Cornelius et al. |
| 4,603,942 A | 8/1986 | Chang et al. |
| 4,610,551 A | 9/1986 | Shah |
| 4,663,965 A | 5/1987 | Metcalf et al. |
| 4,667,097 A * | 5/1987 | Fasching et al. ......... 250/227.14 |

(Continued)

FOREIGN PATENT DOCUMENTS

| | | |
|---|---|---|
| DE | 2521411 A1 | 11/1976 |
| DE | 102005100011402 A1 | 9/2006 |

(Continued)

OTHER PUBLICATIONS

Kulite, Static-Dynamic Transducer, Jun. 17, 2009 (6 pages).
Kurtz, Dr. Anthony D., "Miniature Absolute Pressure Transducer," AFSBIR, Control No. F031-1261 (2003).
Ned, Alexander A.; Kurtz, Dr. Anthony D.; Masheeb, Fawzia; Beheim, Glenn, Leadless SiC Pressure Sensors for High Temperature Applications, 2001 (6 pages).

(Continued)

*Primary Examiner* — Lisa Caputo
*Assistant Examiner* — Brandi N Hopkins
(74) *Attorney, Agent, or Firm* — Middleton Reutlinger

(57) ABSTRACT

Systems and methods for measuring environmental conditions of a sensing location, where a sensor including a measuring surface and a wire coupled in tension to the measuring surface over which ultrasonic signals may be transmitted and sensed. Signal analysis of ultrasonic signals transmitted over the tensioned wire are analyzed to measure one or more environmental conditions acting on the measuring surface.

67 Claims, 13 Drawing Sheets

(56) References Cited

U.S. PATENT DOCUMENTS

| | | | |
|---|---|---|---|
| 4,743,752 A * | 5/1988 | Olsen et al. | 250/206.1 |
| 4,743,870 A | 5/1988 | Jen et al. | |
| 4,783,997 A | 11/1988 | Lynnworth | |
| 4,800,316 A | 1/1989 | Ju-Zhen | |
| 4,823,600 A | 4/1989 | Biegel et al. | |
| 5,003,825 A | 4/1991 | Lew | |
| 5,022,014 A | 6/1991 | Kulczyk et al. | |
| 5,159,838 A | 11/1992 | Lynnworth | |
| 5,545,984 A | 8/1996 | Gloden et al. | |
| 5,670,720 A | 9/1997 | Clark et al. | |
| 5,713,916 A | 2/1998 | Dias | |
| 5,821,430 A | 10/1998 | Kwun et al. | |
| 5,897,569 A | 4/1999 | Kellogg et al. | |
| 5,962,790 A | 10/1999 | Lynnworth et al. | |
| 6,047,602 A | 4/2000 | Lynnworth | |
| 6,081,638 A | 6/2000 | Zhou | |
| 6,281,976 B1 * | 8/2001 | Taylor et al. | 356/480 |
| 6,343,511 B1 | 2/2002 | Lynnworth et al. | |
| 6,413,103 B1 | 7/2002 | Merz et al. | |
| 6,889,552 B2 | 5/2005 | Nguyen et al. | |
| 6,912,907 B2 | 7/2005 | Fujimoto | |
| 6,919,779 B2 | 7/2005 | Raphalovitz et al. | |
| 6,975,179 B2 | 12/2005 | Harris | |
| 7,016,047 B2 | 3/2006 | May | |
| 7,017,415 B2 | 3/2006 | Harrold et al. | |
| 7,162,925 B2 | 1/2007 | Dietrich | |
| 7,258,014 B2 | 8/2007 | Rudkin | |
| 7,454,978 B2 | 11/2008 | Schroeder et al. | |
| 7,952,360 B2 | 5/2011 | Ganesh | |
| 2002/0130253 A1 * | 9/2002 | Yashiro et al. | 250/227.11 |
| 2004/0119552 A1 | 6/2004 | Wray | |
| 2005/0238301 A1 | 10/2005 | Russell et al. | |
| 2006/0290356 A1 | 12/2006 | Pharn et al. | |
| 2008/0090023 A1 | 4/2008 | Nayar et al. | |
| 2008/0307885 A1 | 12/2008 | Ravitch et al. | |
| 2011/0314919 A1 | 12/2011 | Ehlert | |

FOREIGN PATENT DOCUMENTS

| | | |
|---|---|---|
| EP | 0053036 A1 | 6/1982 |
| EP | 0467818 A1 | 1/1992 |
| EP | 1014525 A1 | 6/2000 |
| EP | 1238715 A1 | 9/2002 |
| EP | 1566815 A2 | 8/2005 |
| GB | 2114297 A | 8/1983 |
| JP | 61061027 A | 3/1986 |
| WO | 2007136040 A1 | 11/2007 |

OTHER PUBLICATIONS

Ned, Alexander A.; Kurtz, Anthony D.; Beheim, Glenn; Masheeb, Fawzia; Stefanescu, Sorin; Improve SiC Leadless Pressure Sensors for High Temperature Low and High Pressure Applications; Kulite Semiconductor Products, Inc., presented at the 21st Transducer Workshop, Lexington Park, MD, Jun. 22-23, 2004 (7 pages).

Inagaki, K.; Kolosov, O.V.; Briggs, G. A. D.; Wright, O. B.; Waveguide ultrasonic force microscopy at 60 MHz; Applied Physics Letters, vol. 76, No. 14, Apr. 3, 2000 (3 pages).

Schuet, S; Wheeler, K; Timucin, D.; Kowalski, M.; Wysocki, P.; Introduction & Motivation Characterization of Chafing Damage Model Based Inference, Model Based Inference for Wire Chafe Diagnostics, Intelligent Systems Division, NASA Ames Research Center, Moffett Field, California, Aging Aircraft 2009 (30 pages).

Rose, Joseph L., A Baseline and Vision of Ultrasonic Guided Wave Inspection Potential, Journal of Pressure Vessel Technology, Aug. 2002, vol. 124, pp. 273-282.

Neill, Ian T.; Oppenheim, I. J.; Greve, D.W.; A Wire-Guided Transducer for Acoustic Emission Sensing, Sensors and Smart Structures Technologies for Civil, Mechanical, and Aerospace Systems, 2007, Proc. of SPIE vol. 6529 652913-1 (8 pages).

Stobbe, David M., Acoustoelasticity in 7075-T651 Aluminum and Dependence of Third Order Elastic Constants on Fatigue Damage, A thesis Presented to the Academic Faculty, School of Mechanical Engineer, Georgia Institute of Technology, Aug. 2005 (91 pages).

Ali, M.G.S., Analysis of Broadband Piezoelectric Transducers by Discrete Time Model, Egypt. J. Sol., vol. (23), No. (2), (2000), pp. 287-295.

Greve, David W.; Sohn, Hoon; Yue, C. Patrick; Oppenheim, Irving J., An Inductively Coupled Lamb Wave Transducer, IEEE Sensors Journal, vol. 7, No. 2, Feb. 2007, pp. 295-301.

Huang, Bin; Shung, K. Kik, Characterization of very high frequency transducers with wire target and hydrophone, Institute of Physics Publishing, Journal of Physics: Conference Series 1 (2004) 161-166.

Hollman, Kyle W.; Holland, Mark R.; Miller, James G.; Nagy, Peter B.; Rose, James H., Effective Ultrasonic transmission coefficient for randomly rough surfaces, J. Acoust. Soc. Am. 100 (2), Pt. 1, Aug. 1996, pp. 832-839.

Kwun, Hegeon; Bartels, Keith A.; Hanley, John J., Effects of tensile loading on the properties of elastic-wave propagation in a strand, J. Acoust. Soc. Am 103 (6), Jun. 1998, pp. 3370-3375.

Nieuwenhuis, J. H.; Neumann, J.; Greve, D.W.; Oppenheim, I.J, Generation and detection of guided waves using PZT wafer transducers, Nov. 2005 (19 pages).

Chaki, S.; Bourse, G., Guided ultrasonic waves for non-destructive monitoring of the stress levels in prestressed steel strands, Ultrasonics 49 (2009) 162-171.

Li, Qiuhua; Lieh, Junghsen; Mayer, A, Large deflection of laminated circular plates with clamed edge and uniform loading, Proc. IMechE vol. 219 Part E: J. Process Mechanical Engineering (2005) (6 pages).

Sheplak, Mark; Dugundji, John, Large Deflections of Clamped Circular Plates Under Initial Tension and Transitions to Membrane Behavior, Journal of Applied Mechanics, 1998 (28 Pages).

Behbahani, Alireza R., Need for Robust Sensors for Inherently Fail-Safe Gas Turbine Engine Controls, Monitoring, and Prognostics, May 7, 2006 through Thursday, May 11, 2006, ISA2006, 52nd International Instrumentation Symposium—Cleveland, OH (37 pages).

di Scalea, Francesco Lanza; Rizzo, Piervincenzo; Seible, Frieder, Stress Measurement and Defect Detection in Steel Strands by Guided Stress Waves, Journal of Materials in Civil Engineering © ASCE/ May/Jun. 2003, pp. 219-227.

Miklowitz, Julius, The Theory of Elastic Waves and Waveguides, North-Holland Series in Applied Mathematics and Mechanics, vol. 22, 1978 (634 pages).

Nagy, Peter B.; Kent, Renee M., Ultrasonic assessment of Poisson's ratio in thin rods, J. Acoust. Soc. Am. 98 (5), Pt. 1, Nov. 1995, pp. 2694-2701.

Konkov, E., Ultrasonic Interferometer for High-Accuracy Linear Measurements, Measurement Science Review, vol. 9, No. 6, 2009, pp. 187-188.

Written Opinion of the International Searching Authority for PCT/US2012/043766, Nov. 21, 2012.

Redwood, Martin, Mechanical waveguides; the propagation of acoustic and ultrasonic waves in fluids and solids with boundaries, New York, Pergamon Press. 1960.

Nicholson, N.C. and McDicken, W.N., "Waveguides in medical ultrasonics: effect of waveguide medium upon model amplitude," Ultrasonics 1992 vol. 30, No. 2. (pp. 82-86).

Spratt, William K.; Vetelino, John F.; Lynnworth, Lawrence C., "Torsional Ultrasonic Waveguide Sensor," 2010 IEEE International Ultrasonics Symposium Proceedings (pp. 702-706).

Loveday, Philip W., "Analysis of Piezoelectric Ultrasonic Transducers Attached to Waveguides Using Waveguide Finite Elements," IEEE Transactions on Ultrasonics, Ferroelectrics, and Frequency Control, vol. 54, No. 10, Oct. 2007 (pp. 2045-2051).

Lee, Jung-Ryul and Tsuda, Hiroshi, "Sensor application of fibre ultrasonic waveguide," Meas. Sci. Technol. 17 (2006) pp. 645-652.

Cegla, F.B.; Cawley, P., "Ultrasonic Waveguides for Remote High Temperature NDT," Non-Destructive Testing Group, Department of Mechanical Engineering, Imperial College London SW7 2AZ, United Kingdom.

International Search Report and the Written Opinon for PCT/US2014/63409, Jun. 24, 2015.

International Search Report and the Written Opinion for PCT/US2015/25043, Aug. 4, 2015.

* cited by examiner

ENVIRONMENTAL SENSOR WITH TENSIONED WIRE EXHIBITING VARYING TRANSMISSION CHARACTERISTICS IN RESPONSE TO ENVIRONMENTAL CONDITIONS

GOVERNMENT RIGHTS

Certain aspects of this invention were made with government support under Grant/Contract No. N68335-10-C-0165 and N68335-10-C-0351 awarded by the Naval Air Warfare Center (NAVAIR). The U.S. Government may have certain rights in the invention.

FIELD OF THE INVENTION

The present invention relates to sensing technology, and more particularly to sensors and sensing methods.

BACKGROUND OF THE INVENTION

Many conventional mechanical systems are monitored to determine operating conditions such as pressure, temperature, vibrations, etc. However, in many systems it is desirable to monitor and measure operating conditions at locations in the system where it is extremely difficult to do so. For example, the measurement environment may be a harsh environment in which sensors are unable to operate reliably. For example, monitoring an aero gas turbine engine presents unique challenges due to the harsh environmental conditions of the engine, i.e., high temperatures, high pressures, and high vibrations a sensor is subjected to during operation of the engine. In mechanical systems, conventional sensors used to monitor operating conditions in harsh environments often fail at an extremely high rate and lead to high maintenance costs in maintaining the mechanical system due to limits associated with the materials required to construct the sensors. In addition, conventional sensors typically require a variety of materials bonded together, and the varying limits associated with the varying materials may further complicate sensor design, and may also lead to increased failure rates due to some required materials having low environmental condition limits.

Conventional methods of dealing with the above issues typically involve acknowledging the limits associated with a sensor, the lifetime of the sensor, and that its lifetime and measurement capabilities are limited by the environment within which it is configured. In some systems, conventional methods of dealing with the above issues typically involve fixing a sensor in a location remote from the desired sensing location and estimating operating conditions at the desired sensing location based on the data collected from the remote position.

Consequently, there is a continuing need for improved sensors and sensing methods to address these and other difficulties with conventional sensor technology.

SUMMARY OF THE INVENTION

Embodiments of the invention are generally directed to a sensor and a sensing method, in which signals communicated over one or more wires are monitored such that environmental conditions may be measured based at least in part on characteristics of the communicated signals.

Consistent with some embodiments of the invention, a sensor configured to sense one or more environmental conditions is provided. The sensor comprises a housing having a first and second end, and includes a diaphragm proximate the first end and coupled to the housing. An attachment plate may be coupled to the housing, such that an interior is defined within the housing and between the diaphragm and the attachment plate. A wire may be coupled in tension between the attachment plate and the diaphragm. The wire may exhibit varying ultrasonic signal transmission characteristics as the tension between the wire and the diaphragm changes.

In some embodiments, one or more environmental conditions may act upon the sensor, thereby exerting a force on the diaphragm of the sensor. For example, pressure of the environment in which the sensor is positioned may cause the diaphragm to deflect. In response to the force acting upon the diaphragm, the tension of the wire coupled to the diaphragm may vary. Based at least in part on the varying tension of the wire, transmission characteristics of the wire may change.

In some embodiments, a controller may be operatively coupled to the wire and configured to determine the varying transmission characteristics of the wire. The controller may be further configured to determine environmental conditions based at least in part on the determined varying transmission characteristics. In some embodiments, the controller may be further configured to output a readout signal, where the readout signal includes information based at least in part on the determined environmental conditions.

In further embodiments, the sensor may include a second wire coupled to the attachment plate and configured in the interior, and the second wire may not be tensioned between the attachment plate and the diaphragm. In these embodiments, the second wire may exhibit varying signal transmission characteristics as one or more environmental conditions act upon the sensor. For example, the temperature of the environment in which the sensor is positioned may cause the second wire to exhibit varying signal transmission characteristics. In some embodiments, the controller may be operatively coupled to second wire and configured to determine the varying transmission characteristics of the second wire. In some embodiments, the controller may be further configured to determine environmental conditions based at least in part on the determined varying transmission characteristics of the second wire.

In addition, there are provided methods of sensing an environmental condition consistent with embodiments of the invention. In some embodiments, a pressure may be measured with a sensor. The sensor includes a housing having a first and second end, and a diaphragm proximate the first end and coupled to the housing. An attachment plate may be coupled to the housing such that an interior is defined within the housing and between the diaphragm and the attachment plate. A wire may be coupled in tension between the attachment plate and the diaphragm. The method comprises transmitting an ultrasonic signal through the wire and measuring a force caused by a pressure on the diaphragm of the sensor by sensing an ultrasonic signal from the wire and determining a tension on the wire based upon a characteristic of the sensed ultrasonic signal.

In some embodiments, the sensor may be further configured with a second wire coupled to the attachment plate and configured in the interior, such that the second wire is not tensioned between the attachment plate and the diaphragm. The method may further comprise transmitting a second ultrasonic signal through the second wire. A temperature associated with the sensor may be measured by sensing an ultrasonic signal from second wire and determining the temperature based on a characteristic of the ultrasonic signal sensed in the second wire.

In some embodiments consistent with the invention, a sensor may be positioned proximate a sensing location, and the sensor may be utilized to measure environmental conditions associated with the sensing location, including pressure, temperature, vibration, and/or strain. In one aspect of some embodiments, the sensor may include a measuring surface, where the measuring surface may be positioned such that one or more environmental conditions of the sensing location may interact the measuring surface. Additionally, the sensor may include one or more wires coupled to the measuring surface, where the wires may transmit ultrasonic signals. One or more ultrasonic signals may be transmitted through the wires, and one or more ultrasonic signals may be sensed through the wires. In some embodiments, a controller may be configured to analyze the one or more sensed ultrasonic signals, and a measurement of one or more environmental conditions of the sensing location may be determined based at least in part on the analysis of the one or more sensed ultrasonic signals. In some embodiments, the analysis of the one or more sensed ultrasonic signals may include comparing the one or more sensed ultrasonic signals to the one or more reference ultrasonic signals stored in the controller. In some embodiments, the reference ultrasonic signals may include one or more of the transmitted ultrasonic signals. In some embodiments, the reference ultrasonic signals may include one or more of the sensed ultrasonic signals.

Hence, using the disclosed systems and methods of the invention, improvements may be realized in sensing technology and especially in regard to sensing applications in harsh sensing environments. These and other advantages will be apparent in light of the following figures and Detailed Description.

BRIEF DESCRIPTION OF THE DRAWINGS

The accompanying drawings, which are incorporated in and constitute a part of this specification, illustrate embodiments of the invention, and together with a general description of the invention given above and the detailed description of the embodiments given below, serve to explain the principles of the invention.

Figure 1:
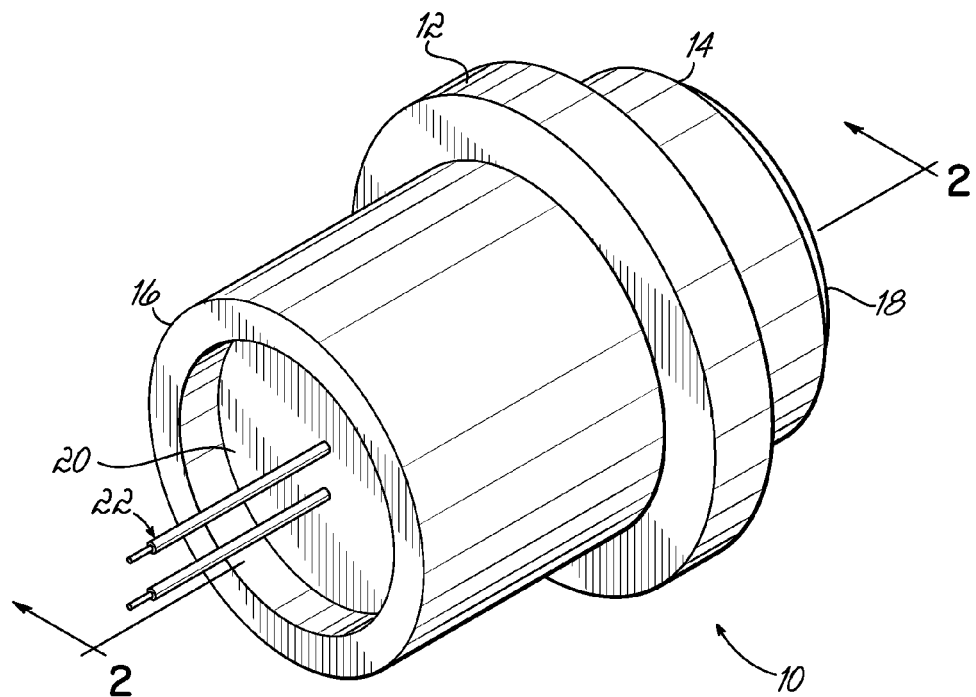
FIG. 1 is a diagrammatic illustration of a sensor consistent with embodiments of the invention.

It should be understood that the appended drawings are not necessarily to scale, presenting a somewhat simplified representation of various features illustrative of the basic principles of embodiments of the invention. The specific design features of embodiments of the invention as disclosed herein, including, for example, specific dimensions, orientations, locations, and shapes of various illustrated components will be determined in part by the particular intended application and use environment. Certain features of the illustrated embodiments may have been enlarged or distorted related to others to facilitate visualization and clear understanding.

DETAILED DESCRIPTION

Embodiments of the invention are generally directed to a sensor and a sensing method, in which signals communicated over one or more wires are monitored such that environmental conditions may be measured based at least in part on characteristics of the communicated signals, where the environmental conditions include pressure, force, temperature, strain, and/or vibration.

In some embodiments consistent with the invention, a pressure sensor may comprise a housing having a first and second end. A diaphragm may be coupled to the housing, proximate the first end, and an attachment plate may be coupled to the housing, such that an interior is defined within the housing and between the diaphragm and the attachment plate. A wire may be coupled in tension between the attachment plate and the diaphragm, such that the wire exhibits a varying ultrasonic signal transmission characteristic as the tension between the attachment plate and the diaphragm changes.

As discussed above, conventional sensors used in harsh sensing environments typically fail at a high rate due to limits associated with the materials required to design the conventional sensors. Embodiments of the invention, however, overcome the material limits of conventional sensors. Sensors consistent with embodiments of the invention may be constructed of a single material, thereby minimizing thermal strains and challenges associated with bonding dissimilar materials. Moreover, embodiments of the present invention may be constructed using a variety of materials, thereby allowing selection of one or more construction materials based on material properties. Suitable materials for housings, diaphragms, and attachment plates include, for example metals and alloys such as stainless steel alloys, titanium and titanium alloys, superalloys (e.g. Inconel® variations), and other materials suitable for harsh environments (i.e. high temperature, high pressure, and/or high vibration environments). Suitable materials for wires include, for example metals and alloys such as stainless steel alloys, titanium and titanium alloys, superalloys (e.g. nickel, cobalt, nickel-iron superalloys, for example Inconel® variations), and other materials suitable for harsh environments (i.e. high temperature, high pressure, and/or high vibration). It will be appreciated that housings, diaphragms, attachment plates and wires in a single sensor design may all be constructed of the same material in some embodiments, while in other embodiments, heterogeneous materials may be used for some of these components.

Embodiments consistent with the present invention may utilize ultrasonic signals, and measure environmental conditions based at least in part on the ultrasonic signals. Ultrasonic signals may generally be transmitted over a large distance, which enables equipment associated with an ultrasonic sensor to be located remote from the desired sensing location, while still being able to measure environmental conditions at the desired sensing location by utilizing sensors consistent with embodiments of the invention positioned in the desired sensing location.

In some embodiments of the invention, the sensor may measure the length change of the tensioned wire. The length of the wire may be found by measuring a varying ultrasonic signal transmission characteristic of the wire. In some embodiments, the varying ultrasonic signal transmission characteristic may include phase of an ultrasonic signal, amplitude of an ultrasonic signal, frequency of an ultrasonic signal, and/or propagation delay of an ultrasonic signal. Consistent with embodiments of the invention, an environmental condition monitored by the sensor may be measured by measuring the difference in one or more of the ultrasonic signal transmission characteristics.

For example, in some embodiments, the sensor may be configured at a sensing location such that the diaphragm separates a pressure difference. In this exemplary embodiment, a force may act on the diaphragm due to the pressure difference across the diaphragm. In this example, the force may deflect the diaphragm in the direction of lower pressure, and the tension of the wire may increase or decrease corresponding to the direction of deflection of the diaphragm. In this example, an ultrasonic signal transmission characteristic may vary as the tension of the wire varies. In this example, an ultrasonic signal may be transmitted through the wire, and a sensed ultrasonic signal may be compared to a reference ultrasonic signal to determine the variance in the ultrasonic signal transmission characteristic. Furthermore, the pressure in the sensing location may be determined based at least in part on the determined variance between the sensed ultrasonic signal transmission characteristic and the reference ultrasonic signal transmission characteristic.

Embodiments consistent with the present invention may sense pressure and temperature of the sensing environment at the sensing location. In some embodiments, the wire may exhibit a varying resistance as a temperature associated with the pressure sensor changes. In some embodiments, a pressure sensor may include a second wire coupled to the attachment plate and configured in the interior, and the second wire may not be tensioned between the diaphragm and the attachment plate. In some embodiments, the second wire may exhibit a varying ultrasonic signal transmission characteristic as the temperature associated with the pressure sensor changes. In embodiments consistent with the present invention, an ultrasonic signal may be transmitted through the second wire, and a second ultrasonic signal sensed on the second wire may be analyzed to determine a variance of an ultrasonic signal transmission characteristic of the second wire as compared to a reference ultrasonic signal transmission characteristic.

Systems and methods consistent with various aspects of the invention may be utilized to transmit and sense ultrasonic signals. In some embodiments, an ultrasonic signal may be transmitted through the wire, and the sensed ultrasonic signal may include a reflection or echo of the transmitted ultrasonic signal. In some embodiments, an ultrasonic signal may be transmitted through the wire, and the sensed ultrasonic signal may include a portion of the transmitted ultrasonic signal. In some embodiments, an ultrasonic signal may be transmitted through the wire, and the sensed ultrasonic signal may be a modification of the transmitted ultrasonic signal. In other embodiments, a wire may have a first end and a second end, and an ultrasonic signal may be transmitted through the wire at the first end, and an ultrasonic signal may be sensed through the wire at a second end, and the sensed ultrasonic signal may be based at least in part on the transmitted ultrasonic signal. The frequency of a transmitted ultrasonic signal may vary in different embodiments, although in many embodiments, a transmitted ultrasonic signal of between about 100 KHz and about 10 MHz, or more particularly a signal of between about 1 MHz and about 5 MHz may be used.

As the sensors may be positioned to measure environmental conditions in sensing locations typically considered harsh sensing environments, materials suitable for harsh environments may be utilized in various combinations to construct sensors consistent with some embodiments of the invention. Moreover, the materials and configurations of wires consistent with embodiments of the invention may comprise similarly suitable materials. In addition, wires consistent with embodiments of the invention generally include material properties making the wires suitable for transmission of ultrasonic signals, including for example, various metals and alloys. Furthermore, while some embodiments include wires comprising a uniform construction, other embodiments may include wires advantageously comprising braided constructions, where braided constructions may provide higher tensile strengths in some embodiments. Uniformly constructed and braided wires comprising diameters between about 0.001 inches and 0.50 inches, or more particularly diameters between 0.005 inches and 0.25 inches may be used. The cross-sectional shapes of wires may vary in different embodiments, although in many embodiments, the cross-sectional shapes in many embodiments may include shapes that may be configured to transmit ultrasonic signals consistent with embodiments of the invention, including, for example substantially circular cross-sectional wires, substantially rectangular cross-sectional wires, substantially ribbon cross-sectional wires, etc.

Turning to the drawings, where like numbers denote like parts throughout the several views, FIG. 1 illustrates a sensor 10 consistent with some embodiments of the invention. Sensor 10 may include a housing 12 having a first end 14 and a second end 16. A diaphragm 18 may be coupled to the housing 12 proximate the first end 14. An attachment plate 20 may be coupled to the housing 12 proximate the second end 16. Sensor 10 may include a wire 22 coupled to attachment plate 20. In embodiments consistent with the invention, the diaphragm 18 may be coupled to the housing 12, including the diaphragm 18 being integral to, attached to, fastened to, welded to, soldered to, and/or brazed to the housing 12.

Figure 2:
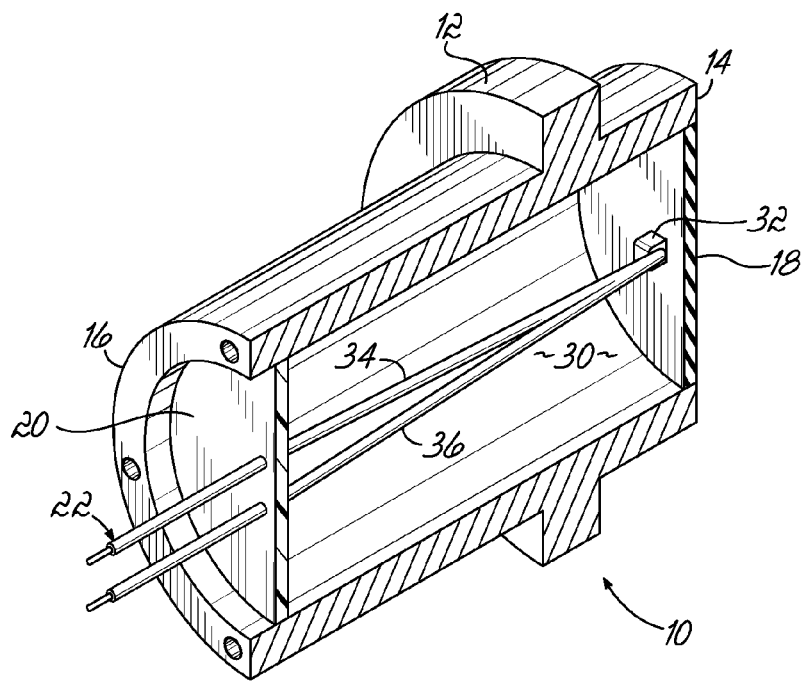
FIG. 2 is a cross sectional view of the sensor of FIG. 1, taken along lines 2-2.

FIG. 2 illustrates a cross sectional view of sensor 10 consistent of FIG. 1. Consistent with some embodiments of the invention, diaphragm 18 and attachment plate 20 may be coupled to housing 12 such that interior 30 is defined therebetween. Securing member 32 may be coupled to diaphragm 18, as shown, and may extend from diaphragm 18 into interior 30. As shown in FIG. 2, consistent with some embodiments of the invention, a first portion 34 of wire 22 may be coupled to the attachment plate 20 at a first end and to the diaphragm 18 utilizing the securing member 32, and a second portion 36 of wire 22 may be coupled to the attachment plate 20 at a second end and also to the diaphragm 18 utilizing the securing member 32, such that portions 34, 36 may both be tensioned between attachment plate 20 and diaphragm 18. Furthermore, the securing member 32 may comprise a hook, eyelet, set screw, and/or other securing member configured to couple wire 22 in tension between the diaphragm 18 and the attachment plate 20.

In some embodiments, the wire 22 may be tensioned between the diaphragm 18 and attachment plate 20 such that the tension of wire 22 may vary in response to a deflection of the diaphragm. In some embodiments, at least a portion of wire 22 may be initially tensioned at a desired force between the diaphragm 18 and the attachment plate 20. For example, in some embodiments, at least a portion of wire 22 may be initially tensioned from about 1 pound to about thirty pounds, or more particularly at least a portion of wire 22 may be initially tensioned from about 10 pounds to 13 pounds. In some embodiments, the initial tension applied to wire 22 may be determined based at least in part on properties of the materials used to form the wire 22, the diaphragm 18, the attachment plate 20, and/or the housing 12.

Figure 3:
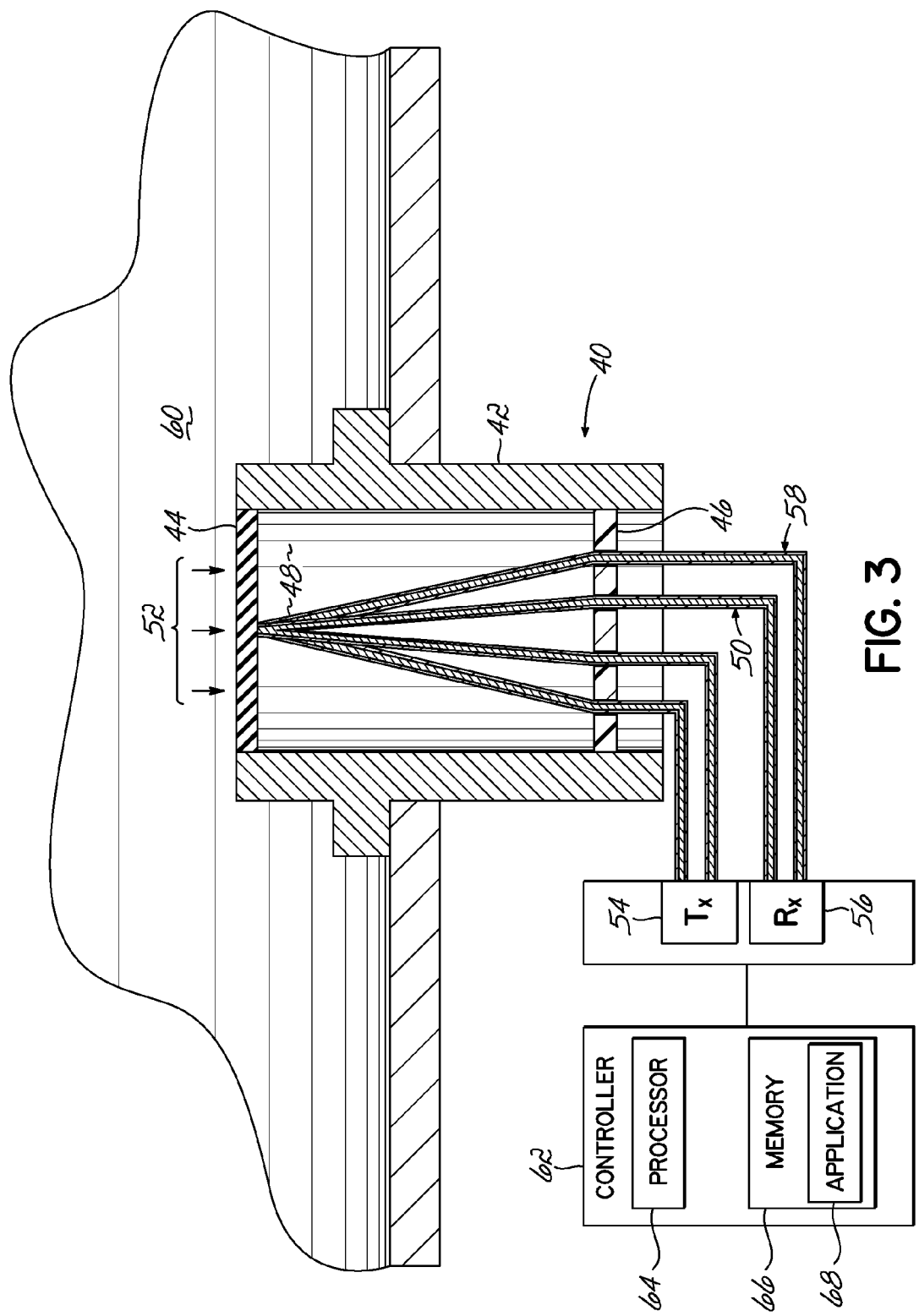
FIG. 3 is a cross sectional view of a sensor consistent with some embodiments of the invention positioned in a sensing location and configured to measure one or more environmental conditions of the sensing location.

FIG. 3 illustrates a cross-sectional a sensor and further illustrates some aspects of a sensor 40 consistent with some embodiments of the invention. As shown in FIG. 3, sensor 40 includes housing 42, a diaphragm 44 coupled to the housing proximate a first end of housing 42, and an attachment plate 46 coupled to the housing proximate a second end of housing 42 such that interior 48 may be defined in sensor 40 by housing 42, diaphragm 44, and attachment plate 46. Moreover, wire 50 may be coupled in tension between diaphragm 44 and attachment plate 46 within interior 48. Furthermore, force 52 may act upon diaphragm 44, such that diaphragm 44 may deflect in response to force 52. As such, the tensional force on wire 50 between diaphragm 44 and attachment plate 46 may vary in response to the deflection of diaphragm 44 due to force 52. Transmitting circuitry 54 may be operatively coupled to wire 50, such that transmitting circuitry 54 may be configured to transmit an ultrasonic signal through wire 50. Receiving circuitry 56 may be operatively coupled to wire 50, such that receiving circuitry may be configured to sense an ultrasonic signal from wire 50. In FIG. 3, wire 58 may be configured in interior 48, and wire 58 may not be tensioned between the diaphragm 44 and the attachment plate 46. Wire 58 may be operatively coupled to transmitting circuitry 54, such that transmitting circuitry may be configured to transmit an ultrasonic signal through wire 58. Receiving circuitry 56 may be operatively coupled to wire 58, such that receiving circuitry may be configured to sense an ultrasonic signal from wire 58.

As discussed above, diaphragm 44 may deflect when acted upon by force 52 of sensing location 60 in which sensor 40 is configured. As such, in response to a deflection of diaphragm 44 caused by an environmental condition present in the sensing location 60 in which sensor 40 may be placed, the tensional force on wire 50 may vary. Environmental conditions including pressure, temperature, vibration, and strain may cause a force to act upon diaphragm 44, thereby causing a deflection. As the tensional force on wire 50 varies in response to the deflection of diaphragm 44, an ultrasonic signal transmission characteristic of wire 50 may vary based at least in part on the varying tensional force. Transmitting circuitry 54 may transmit an ultrasonic signal through wire 50, and receiving circuitry 56 may sense an ultrasonic signal transmitted through wire 50. As shown in FIG. 3, transmitting circuitry 54 and receiving circuitry 56 may be operatively connected to controller 62, which includes processor 64, memory 66, and application 68 resident in memory 66. Controller 62 may be configured to control transmitting circuitry 54 and receiving circuitry 56, and/or transmitting circuitry 54 and receiving circuitry 56 may be configured as one or more interfaces of controller 62.

In some embodiments consistent with the invention, an ultrasonic signal sensed using receiving circuitry 56 may be compared to a reference ultrasonic signal to determine a variance of one or more ultrasonic signal transmission characteristics of wire 50 that varied as a result of a deflection of diaphragm 44. Furthermore, in some embodiments, a measurement of an environmental condition of sensing location 60 may be generated based at least in part on the determined ultrasonic signal transmission characteristic variance of wire 50.

FIG. 3 illustrates a sensor 40 consistent with embodiments of the invention configured to measure an environmental condition in sensing location 60. In some embodiments, at least a portion of interior 48 may be pressurized to be above atmospheric pressure, pressurized to be about atmospheric pressure, or depressurized to be below atmospheric pressure. In these embodiments, the pressurization or depressurization of a portion of interior 48 may cause a pressure differential between sensing location 60 and interior 48, such that a force may act on diaphragm 44. For example, if sensor 40 is placed in a sensing location 60 having a pressure differential as compared to interior 48, the pressure differential between interior 48 and sensing location 60 may cause a force 52 to act upon diaphragm 44. For example, if the pressure of interior 48 were configured to be about atmospheric pressure, and the pressure of sensing location 60 were higher than the pressure of interior 48, diaphragm 44 may deflect into interior 48. In this example, as diaphragm 44 deflects into interior 48 due to the higher pressure environment of sensing location 60, the tension of wire 50 may vary, and in response to the varying tension of wire 50, an ultrasonic transmission characteristic of wire 50 may vary.

In some embodiments, controller 62 may be operatively coupled to wire 50, and configured to transmit an ultrasonic signal through wire 50, and the controller may also be configured to sense an ultrasonic signal transmitted through wire 50. In some embodiments consistent with the invention, controller 62 may be configured to determine an ultrasonic signal transmission characteristic of wire 50 based at least in part on an ultrasonic signal sensed from wire 50. In embodiments consistent with the invention ultrasonic signal transmission characteristics of wire 50 include phase of an ultrasonic signal, amplitude of an ultrasonic signal, frequency of an ultrasonic signal, and propagation delay of an ultrasonic signal. In some embodiments, controller 62 may be further configured to determine a deflection of diaphragm 44 based at least in part on a determined ultrasonic signal transmission characteristic. In some embodiments, controller 62 may determine an environmental condition of sensing location 60 based at least in part on the determined deflection of diaphragm 44. In some embodiments, controller 62 may determine a pressure of sensing location 60 based at least in part on the variance of an ultrasonic signal transmission characteristic of wire 50 and/or the deflection of diaphragm 44.

Referring to FIG. 3, controller 62 may transmit an ultrasonic signal through wire 50, and controller 62 may further sense an ultrasonic signal transmitted through wire 50. In some embodiments, the sensed ultrasonic signal may be based at least in part on the transmitted ultrasonic signal, but due to the environmental conditions of sensing location 60 acting on sensor 40, the sensed ultrasonic signal may include signal characteristics that vary from the transmitted ultrasonic signal characteristics. Controller 62 may compare the ultrasonic signal characteristics of the transmitted ultrasonic signal and the sensed ultrasonic signal to determine a varying ultrasonic signal transmission characteristic of wire 50.

As is generally known in the field, signal processing methods including filtering, demodulation, and Hilbert transform processing methods may be used to determine one or more ultrasonic signal transmission characteristics. In some embodiments, controller 62 may perform one or more signal processing operations on the ultrasonic signal sensed on wire 50 to determine one or more ultrasonic signal transmission characteristics of wire 50 as well as the variance of one or more ultrasonic signal transmission characteristics of wire 50.

In some embodiments, an ultrasonic signal may be sensed on wire 50 to determine additional environmental conditions of sensing location 60, including temperature, strain, and vibration. An ultrasonic signal may be sensed on wire 50, and the resistance of the wire may be determined based at least in part on the sensed ultrasonic signal. In some embodiments, a temperature associated with the sensor 40 and/or sensing location 60 may be determined based at least in part on the determined resistance of wire 50.

As shown in FIG. 3, in some embodiments, sensor 40 may include wire 58 positioned in interior 48. As compared to wire 50, wire 58 may be substantially proximate to and/or co-located in relation to wire 50, but wire 58 may not be coupled in tension between diaphragm 44 and attachment plate 46. As such, ultrasonic transmission characteristics of wire 58 may not vary in response to a deflection of diaphragm 44. In these embodiments, an ultrasonic signal may be transmitted through wire 58, and an ultrasonic signal may be sensed through wire 58, and ultrasonic signal sensed through wire 58 may be used to determine a varying ultrasonic transmission characteristic of wire 58. In some embodiments, the determined varying ultrasonic transmission characteristic may be used to determine one or more environmental conditions of sensing location 60, such as temperature, vibration, and strain.

In addition, as wire 50 may be tensioned between diaphragm 44 and attachment plate 46, and wire 58 may not be tensioned between diaphragm 44 and attachment plate 46, the ultrasonic signal sensed on wire 58 may be used as a reference signal by the controller 62 to be compared to the ultrasonic signal sensed on wire 50. In some embodiments, the variance of an ultrasonic transmission characteristic of wire 50 and wire 58 may differ only with respect to the variance attributable to the varying tension of wire 58 caused by the deflection of diaphragm 44. As such, in these embodiments, the variance of an ultrasonic transmission characteristic attributable to the varying tension of wire 50 caused by the deflection of diaphragm 44 may be determined by comparing the ultrasonic signal sensed from wire 50 to the ultrasonic signal sensed from wire 58. In addition, in these embodiments, an environmental condition of sensing location 60 may be determined based at least in part on the deflection of diaphragm 44 corresponding to the environmental condition. For example, if an environmental condition of sensing location 60 included a pressure higher than interior 48, the force caused by the pressure differential may cause a deflection of diaphragm 44 into interior 48. In response, the tensional force on wire 50 may vary, thereby causing the transmission path length of wire 50 to shorten. However, in this example, the high pressure environmental condition of sensing location 60 may not be the only environmental condition causing the transmission path length of wire 50 to change. For example, the temperature of sensing location 60 and/or a temperature associated with sensor 40 may cause thermal expansion of wire 50, thereby increasing the transmission path length of wire 50. In order to separate the transmission path length change of wire 50 due to the pressure differential from the temperature of sensing location 60, the ultrasonic transmission characteristic of wire 58 may be compared to the sensed ultrasonic transmission characteristic of wire 50. In this example, the ultrasonic transmission characteristic of wire 58 may vary due to other environmental conditions of sensing location 60, while not varying due to the pressure differential, and the variance of the ultrasonic transmission characteristic of wire 50 due to the deflection of diaphragm 44, and therefore the pressure differential may thereby be determined.

In some embodiments, the transmission path length change of wire 50 due to the deflection of diaphragm 44 may be determined based at least in part on the determined variance of the ultrasonic transmission characteristic of wire 50 due to the deflection of diaphragm 44. Furthermore, the deflection of diaphragm 44 may be determined based at least in part on the determined transmission path length change of wire 50. In some embodiments, a measurement of an environmental condition of sensing location 60 may be determined based at least in part on the determined deflection of diaphragm 44.

In some embodiments, the temperature of sensing location 60 may be determined based at least in part on the variance of an ultrasonic transmission characteristic of wire 58. As discussed, wire 58 may not be coupled in tension between diaphragm 44 and attachment plate 46, and as such, variance of an ultrasonic transmission characteristic of wire 58 may correspond to a thermal expansion of wire 58 due to a temperature associated with the sensor and/or sensing location 60. For example, the path length of wire 58 may vary due to thermal expansion caused by the temperature of sensor 40 and sensing location 60. In some embodiments, transmitting circuitry 54 may be configured to transmit a first ultrasonic signal through wire 50 and a second ultrasonic signal through wire 58. In some embodiments, transmitting circuitry 54 may be configured to transmit an ultrasonic signal through wire 50 and wire 58. Furthermore, in some embodiments, the ultrasonic signal sensed from wire 50 may be analyzed to determine a force on diaphragm 44, and the ultrasonic signal sensed from wire 58 may be analyzed to determine a temperature associated with sensor and/or sensing location 60.

In some embodiments, wire 50 may exhibit a varying resistance as a temperature associated with the sensor 40 and/or sensing location 60 changes. As such, in some embodiments, a temperature associated with the sensor 40 and/or sensing location 60 may be determined based at least in part on the varying resistance of wire 50. Furthermore, in these embodiments, a pressure of sensing location 60 may be determined based in part on a varying ultrasonic transmission characteristic of wire 50. In some embodiments, the determined pressure of sensing location 60 based in part on the varying ultrasonic signal transmission characteristic of wire 50 may be adjusted based in part on the determined temperature associated with the sensor. In some embodiments, a temperature compensated pressure measurement of sensing location 60 may be determined.

In some embodiments, wire 58 may be operatively connected to the housing 42, and wire 58 may exhibit a varying ultrasonic signal transmission characteristic as the temperature associated with the housing 42 changes. In some embodiments, an ultrasonic signal may be sensed from wire 58, and a varying ultrasonic signal transmission characteristic of wire 58 may be determined based in part on the sensed ultrasonic signal from wire 58. In some embodiments, a temperature associated with the housing 42 may be determined utilizing the determined varying ultrasonic signal transmission characteristic of wire 58.

In some embodiments, wire 58 may be operatively connected to the housing 42, and wire 58 may exhibit a varying resistance as the temperature associated with the housing 42 changes. In some embodiments, the resistance of wire 58 may be determined, and a temperature associated with the housing 42 may be determined utilizing the determined resistance.

Figure 4:
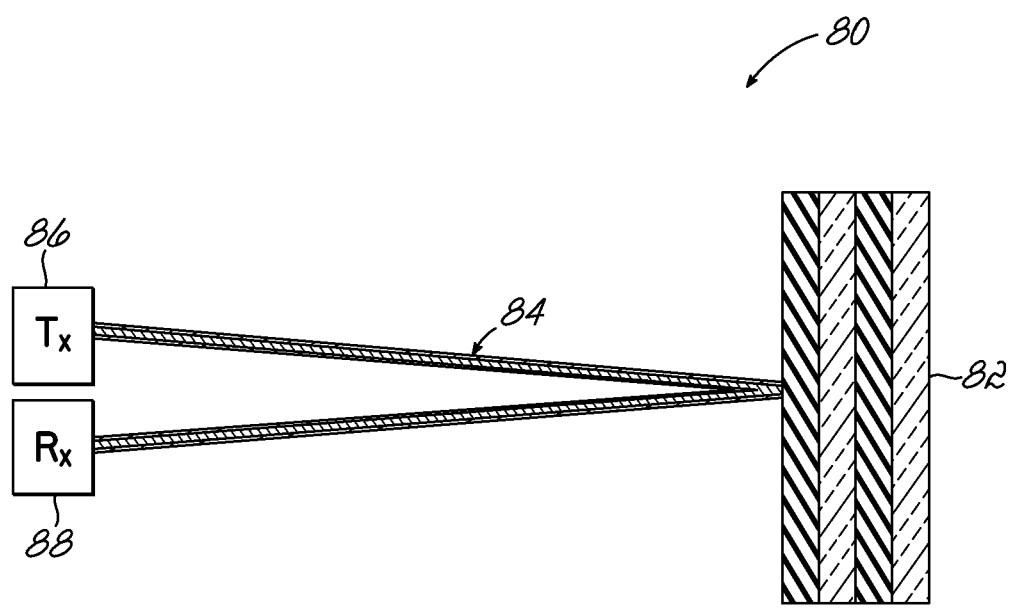
FIG. 4 is a cross sectional view of a sensor consistent with some embodiments of the invention.

Referring now to FIG. 4, FIG. 4 illustrates a cross-sectional view of a sensor 80 consistent with some embodiments of the invention. Sensor 80 includes a filter plate 82 coupled to a wire 84, where the wire may be configured to transmit ultrasonic signals. As shown in FIG. 4, sensor 80 may further include transmitting circuitry 86 and receiving circuitry 88 operatively connected to wire 84. Consistent with some embodiments of the invention, filter plate 82 may comprise layers of one or more materials. Wire 84 may be coupled to filter plate 82 such that filter plate 82 may receive an ultrasonic signal transmitted through wire 84, where the received ultrasonic signal may be of a first frequency band. In some embodiments, the filter plate 82 may be configured to generate a reflected ultrasonic signal of a second frequency band based in part on the received ultrasonic signal, and the reflected ultrasonic signal may be transmitted through wire 84. In some embodiments, the filter plate 82 may be configured such that the layers of filter plate 82 may deflect from a neutral position in response to a force acting on the filter plate 82. In some embodiments, as filter plate 82 deflects due to a force, the spacing between the layers, the strain on each layer, and/or the resonant frequence of the filter plate 82 may vary. As such, the filter plate 82 may filter a frequency range of the received ultrasonic signal, such that the frequency range of the reflected ultrasonic signal may be a subset of the received ultrasonic signal.

As shown, wire 84 may be operatively coupled with ultrasonic transmitting 86 and receiving circuitry 88 such that an ultrasonic signal may be transmitted through wire 84, and the reflected ultrasonic signal may be sensed on wire 84. Not shown in FIG. 4, in further embodiments a controller may be operatively coupled to the transmitting and receiving circuitry 86, 88 such that the controller may analyze the sensed reflected ultrasonic signal. In some embodiments, the controller may be configured to analyze the sensed reflected ultrasonic signal to determine frequency bands filtered from the sensed reflected ultrasonic signal as compared to the transmitted ultrasonic signal. In some embodiments, the controller may determine a measurement of the force on filter plate 88 based at least in part on the determined frequency bands filtered from the sensed reflected ultrasonic signal.

In some embodiments consistent with sensor 80 of FIG. 4, the filter plate 82 may be configured to reflect the received ultrasonic signal, and the change in frequency of the reflected ultrasonic signal may be determined. The transmitting circuitry may transmit an ultrasonic signal centered on a modulation frequency. Depending upon the spacing between the layers of filter plate 82 and the strain on layers of filter plate 82 due to a force, the resonant frequency of the filter plate 82 may vary, and the filter plate 82 may filter the received ultrasonic signal. Due to the change in resonant frequency of the filter plate 82, the filter plate 82 may remove spectral content of a given frequency band. The reflected ultrasonic signal may include a frequency band corresponding to the frequencies not filtered by filter plate 82. In some embodiments, a pressure differential may cause a force on filter plate 82, and as the pressure increases, the spacing of the layers of filter plate 88 may change, causing the resonant frequency of the filter plate 82 to change, thereby filtering a varying frequency band of the received ultrasonic signal based at least in part on the pressure on filter plate 82. The controller may measure the change in frequency between the transmitted ultrasonic signal and the sensed ultrasonic signal and calculate the corresponding change in spacing of the layers of the filter plate 88, which may correspond to the pressure differential acting on the filter plate 82.

In some embodiments, a sensor consistent with some embodiments may include a filter plate, as shown in FIG. 4 and a wire coupled to the filter plate. In some embodiments, transmitting an ultrasonic signal through and sensing of an ultrasonic signal from the wire may be performed at a common end, such that a pulse/echo ultrasonic signal method may be utilized. As such, in these embodiments, the transmitting and receiving circuitry may be operatively connected to a common end of the wire, and/or the transmitting and receiving circuitry may comprise a combined transceiver circuitry. In these embodiments, an ultrasonic signal may be transmitted through the wire and reflected by the filter plate to the receiving/transceiving circuitry.

Figure 5:
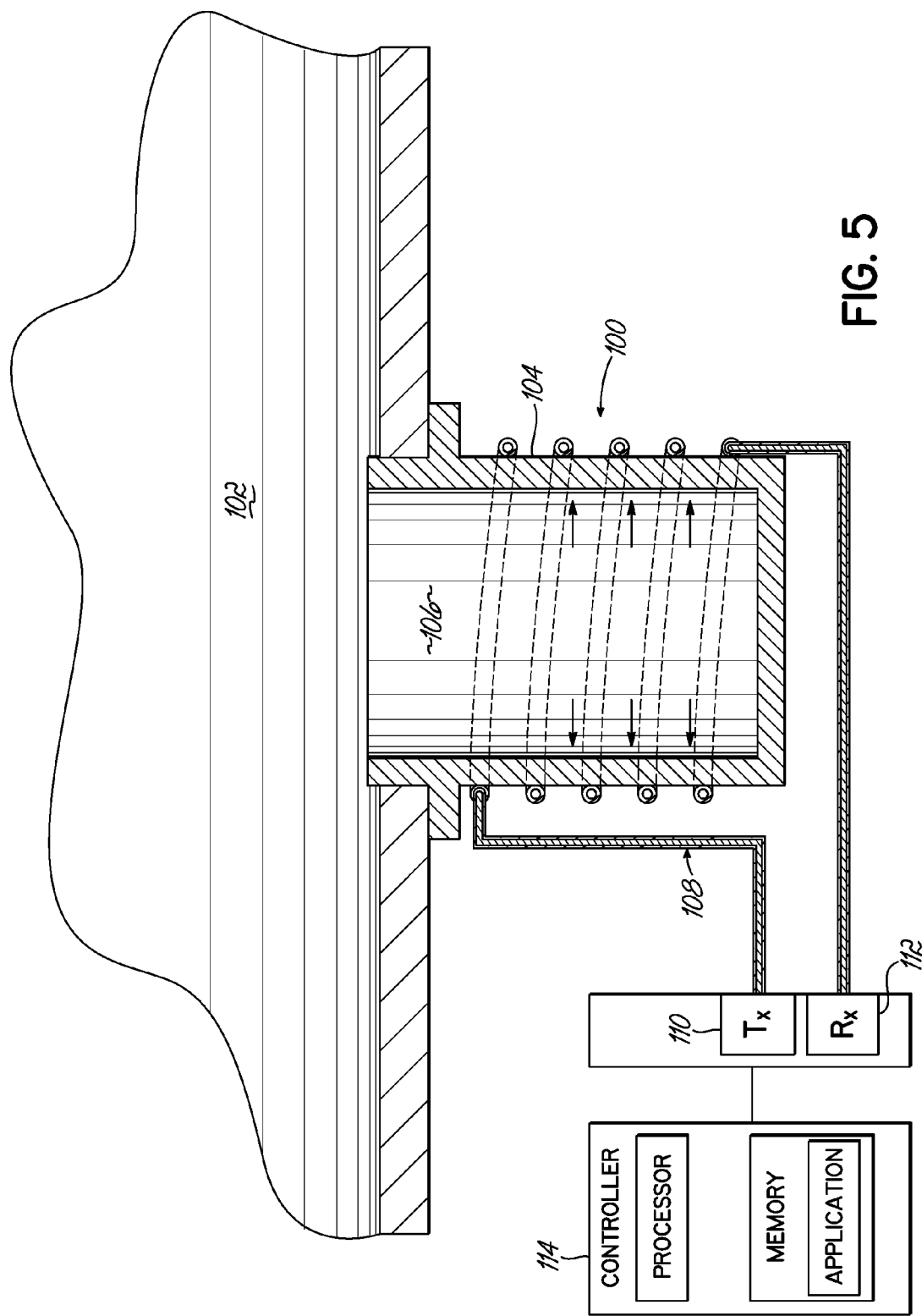
FIG. 5 is a cross sectional view of a sensor consistent with embodiments of the invention positioned in a sensing location and configured to measure one or more environmental conditions of the sensing location.

Referring now to FIG. 5, FIG. 5 illustrates a sensor 100 consistent with some embodiments of the invention. Sensor 100 is positioned to measure one or more environmental conditions of sensing location 102. Sensor 100 includes a housing 104, the housing including an interior 106. As shown in FIG. 5, interior 106 may be in fluid communication with sensing location 102, such that environmental conditions of sensing location 102 may exert force on the surface of housing 104 defining interior 106. Sensor 100 may include wire 108 at least partially connected to housing 104. At least a portion of wire 108 may be coupled in tension to housing 104, such that wire 108 may exhibit a varying ultrasonic signal transmission characteristic as a force acts on housing 104. In some embodiments, wire 108 may be operatively coupled to transmitting circuitry 110 such that an ultrasonic signal may be transmitted through wire 108, and wire 108 may be operatively coupled to receiving circuitry 112 such that an ultrasonic signal may be sensed from wire 108. Controller 114 may be operatively coupled to transmitting circuitry 110 and receiving circuitry 112, such that controller 114 may analyze the ultrasonic signal sensed on wire 108 to determine a varying ultrasonic signal transmission characteristic of wire 108.

Figure 6:
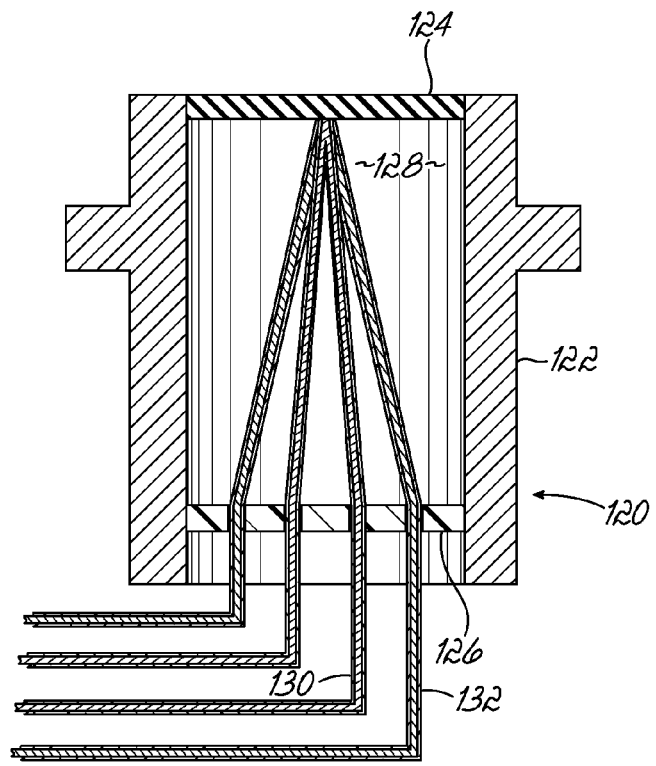
FIG. 6 is a cross sectional view of a sensor consistent with some embodiments of the invention.

FIG. 6 illustrates a cross-sectional view of a sensor 120 consistent with some embodiments of the invention. As shown in FIG. 6, sensor 120 includes a housing 122 having a diaphragm 124 coupled to housing 122 proximate a first end and an attachment plate 126 coupled to housing 122 proximate a second end, such that interior 128 may be defined by housing 122, diaphragm 124, and attachment plate 126. As shown in FIG. 6, sensor 120 includes wire 130 coupled in tension between diaphragm 124 and attachment plate 126. Furthermore, sensor 120 may include wire 132, which may be coupled in tension between diaphragm 124 and attachment plate 126. In some embodiments, wire 132 may be tensioned such that wire 132 exhibits a varying resistance as a temperature associated with sensor 120 changes, and the resistance of wire 132 may be analyzed to determine the temperature associated with sensor 120.

Alternatively, wire 132 may be operatively connected to diaphragm 124 and may not be coupled in tension between attachment plate 126 and diaphragm 124. In some embodiments, wire 132 may exhibit a varying ultrasonic signal transmission characteristic as the temperature associated with the diaphragm 124 changes. In some embodiments, an ultrasonic signal may be sensed from wire 132, and the ultrasonic signal sensed from wire 132 may be analyzed to determine the varying ultrasonic signal transmission characteristic of wire 132. In some embodiments, the varying ultrasonic signal transmission characteristic of wire 132 may be analyzed to determine a temperature associated with the diaphragm 124. In some embodiments, wire 132 may exhibit a varying resistance as the temperature associated with the diaphragm 124 changes. In some embodiments, the resistance of wire 132 may be determined, and a temperature associated with the diaphragm 124 may be determined based at least in part on the determined resistance of wire 132.

Figure 7:
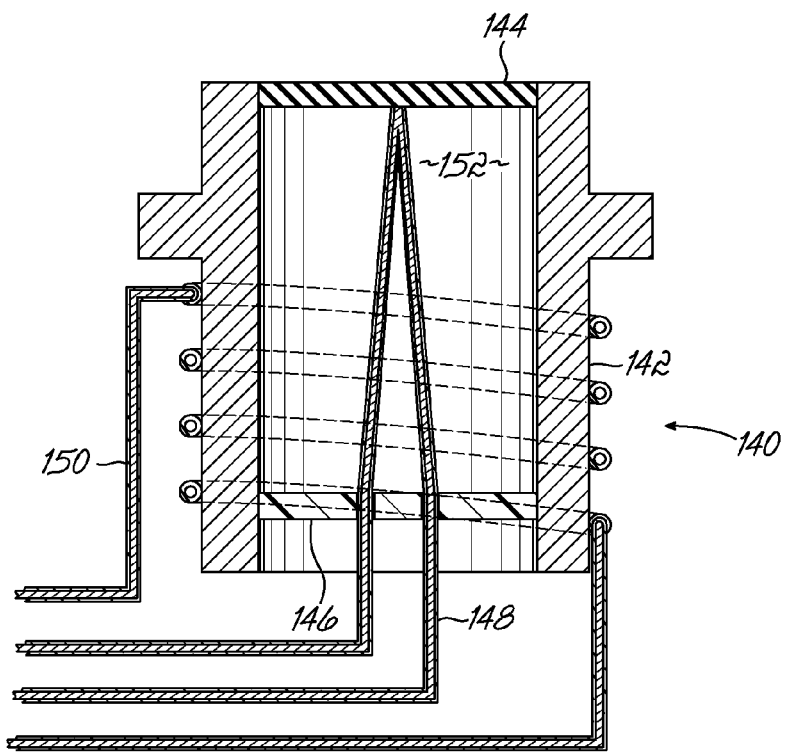
FIG. 7 is a cross sectional view of a sensor consistent with some embodiments of the invention.

FIG. 7 illustrates a cross-sectional view of a sensor 140 consistent with some embodiments of the invention. As shown in FIG. 7, sensor 140 includes a housing 142, a diaphragm 144 coupled to the housing, and an attachment plate 146 coupled to the housing. Sensor 140 includes a wire 148 coupled in tension between the diaphragm 144 and the attachment plate 146. Furthermore, sensor 140 includes wire 150 operatively connected to housing 142, and configured at least partially around housing 142. As shown in FIG. 7, in some embodiments, wire 150 may be connected to the exterior of housing 142, and in other embodiments, wire 150 may be positioned in interior 152 and connected to the interior surface of housing 142. In some embodiments, wire 150 may exhibit a varying ultrasonic signal transmission characteristic as a temperature associated with sensor 140 changes. In some embodiments, wire 150 may exhibit a varying resistance as a temperature associated with sensor 140 changes.

Figure 8:
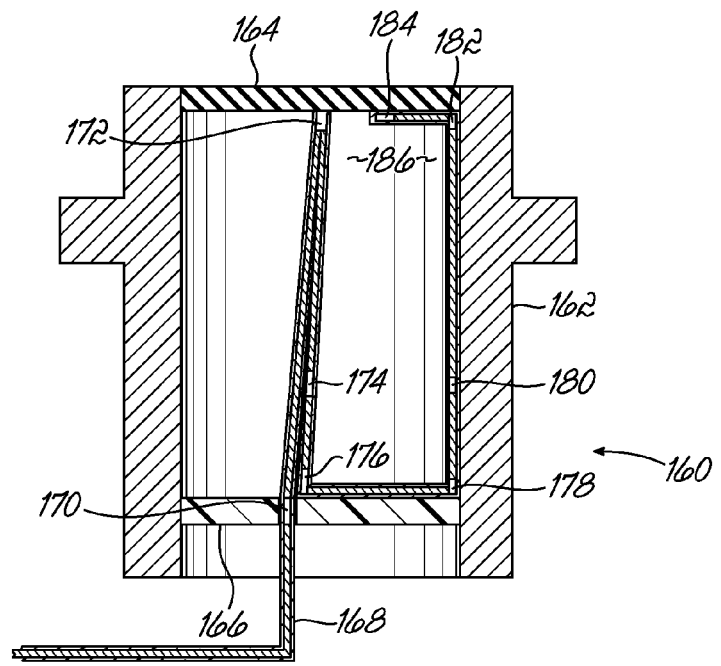
FIG. 8 is a cross sectional view of a sensor consistent with some embodiments of the invention.

FIG. 8 illustrates a cross sectional view of a sensor 160 having a housing 162, a diaphragm 164, and an attachment plate 166. Sensor 160 includes wire 168, and wire 168 includes reflection points 170, 172, 174, 176, 178, 180, 182, 184. A first portion of wire 168 may be coupled in tension between the diaphragm 164 and the attachment plate 166, where reflection point 170 and reflection point 172 approximately define the first portion of wire 168.

In some embodiments, the reflection points 170, 172, 174, 176, 178, 180, 182, 184 may be configured to each reflect an ultrasonic signal transmitted through wire 168, such that a reflection based at least in part on the transmitted ultrasonic signal may be reflected from the reflection points 170, 172, 174, 176, 178, 180, 182, 184 back to the end of wire 168 from which the transmitted ultrasonic signal was introduced. As such, a reflected signal from each reflection point 170, 172, 174, 176, 178, 180, 182, 184 may be sensed on the wire 168, the sensed reflected signals may be analyzed, and measurements associated with the sensor 160 may be determined based at least in part on the sensed reflected signals.

In some embodiments, a pressure associated with sensor 160 may be determined. As described previously, a pressure associated with the sensor 160 and/or a sensing location in which the sensor 160 may exert a force on diaphragm 164 of sensor 160, which may cause a deflection of diaphragm 164. In response to the deflection of diaphragm 164, the tension of the first portion of wire 168 coupled in tension between diaphragm 164 and attachment plate 166 may thereby change. An ultrasonic signal may be transmitted through wire 168, reflection point 170 may reflect a first reflected signal, and reflection point 172 may reflect a second reflected signal. A controller operatively connected to wire 168 may sense the first reflected signal and the second reflected signal, and the controller may analyze the sensed reflected signals. As such, the tension of the first portion, the deflection of the diaphragm, the force acting on the diaphragm, and/or the pressure associated with the sensor and/or sensing location may be determined based at least in part on the analyzed sensed reflected signals.

Additional measurements such as a temperature associated with the diaphragm 164, a temperature associated with the housing 162, and/or a temperature associated with the first portion (i.e., the tensioned portion approximately defined by reflection points 170 and 172) may be determined by analyzing the reflected signals from reflection points 174, 176, 178, 180, 182, and 184 included on wire 168. Where this second portion of wire 168 configured in interior 186 may be defined as the length of wire 168 located from approximately reflection point 172 to reflection point 184, and the second portion of wire may not be coupled in tension. These additional measurements may be extremely valuable in not only providing measurements associated with the sensor and/or sensing location, but also compensating for additional environmental condition factors in measurements of the sensor. Additional environmental condition factors include for example, expansion of the housing 162 due to thermal expansion (e.g., analyzing the sensed reflected signals associated with reflection points 178 and 180), expansion of the wire 168 due to thermal expansion (e.g., analyzing the sensed reflected signals associated with reflection points 174 and 176), and/or change of stiffness/rigidity of the diaphragm 164 due to temperature (analyzing the sensed reflected signals associated with reflection points 182 and 184).

As such, in some embodiments, sensor 160 may determine a temperature associated with the housing 162. An ultrasonic signal may be transmitted through wire 168, reflection point 178 may reflect a third reflected signal, and reflection point 180 may reflect a fourth reflected signal. A controller operatively connected to wire 168 may sense the third reflected signal and the fourth reflected signal, and the controller may analyze the sensed third and fourth reflected signals. As such, a temperature associated with the housing 162, sensor 160 and/or the sensing location may be determined based at least in part on the analyzed sensed third and fourth reflected signals. Moreover, determining a pressure associated with the sensor 160 and/or a sensing location may be based at least in part on the sensed third and fourth reflected signals, such that the determined pressure measurement may include compensation for the temperature determined using the third and fourth reflected signals.

In some embodiments, sensor 160 may determine a temperature associated with the first portion (i.e. tensioned portion) of wire 168. An ultrasonic signal may be transmitted through wire 168, reflection point 174 may reflect a fifth reflected signal, and reflection point 176 may reflect a sixth reflected signal. A controller operatively connected to wire 168 may sense the fifth reflected signal and the sixth reflected signal, and the controller may analyze the sensed fifth and sixth reflected signals. As such, a temperature associated with the first portion of wire 168, sensor 160 and/or the sensing location may be determined based at least in part on the analyzed sensed fifth and sixth reflected signals. Moreover, determining a pressure associated with the sensor 160 and/or a sensing location may be based at least in part on the sensed fifth and sixth reflected signals, such that the determined pressure measurement may include compensation for the temperature determined using the fifth and sixth reflected signals.

In some embodiments, sensor 160 may determine a temperature associated with the diaphragm 164. An ultrasonic signal may be transmitted through wire 168, reflection point 182 may reflect a seventh reflected signal, and reflection point 184 may reflect an eighth reflected signal. A controller operatively connected to wire 168 may sense the seventh reflected signal and the eighth reflected signal, and the controller may analyze the sensed seventh and eighth reflected signals. As such, a temperature associated with the diaphragm 164, sensor 160 and/or the sensing location may be determined based at least in part on the analyzed seventh and eighth reflected signals. Moreover, determining a pressure associated with the sensor 160 and/or a sensing location may be based at least in part on the sensed seventh and eighth reflected signals, such that the determined pressure measurement may include compensation for the temperature determined using the seventh and eighth reflected signals, such that the determined pressure may include compensation for a change in stiffness/rigidity of the diaphragm 164.

Figure 9:
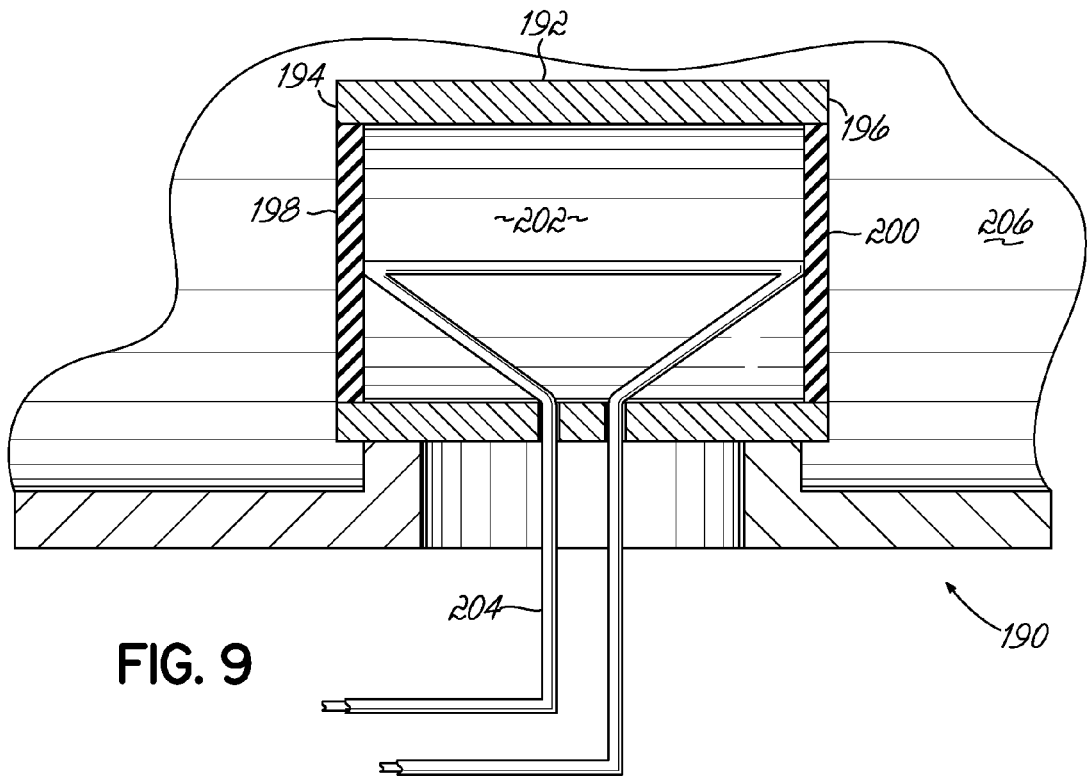
FIG. 9 is a cross sectional view of a sensor consistent with some embodiments of the invention.

Referring now to FIG. 9, a cross-sectional view of a sensor 190 consistent with some embodiments of the invention is provided. Sensor 190 includes a housing 192 having a first end 194 and a second end 196. As shown in FIG. 9, sensor 190 includes a first diaphragm 198 coupled to the housing 192 proximate the first end 194 and a second diaphragm 200 coupled to the housing 192 proximate the second end 196 such that an interior 192 may be defined between the housing 192, the first diaphragm 198, and the second diaphragm 200. Sensor 190 further includes a wire 204 coupled in tension between the first diaphragm 198 and the second diaphragm 200, such that the wire 204 exhibits a varying characteristic as the tension between the first diaphragm 198 and the second diaphragm 200 changes. In some embodiments, the varying characteristic includes resistance of wire 204, and in some embodiments, the varying characteristic includes an ultrasonic signal transmission characteristic. As discussed above with regard to various embodiments of the invention, an ultrasonic signal may be transmitted through wire 204, and an ultrasonic signal may be sensed through wire 204. Moreover, sensor 200 may be positioned in a sensing location 206, such that environmental conditions including pressure, temperature, vibration, and strain may exert force on sensor 190, and particularly on the first diaphragm 198 and the second diaphragm 200. In some embodiments, a measurement of one or more environmental conditions of a sensing location 206 may be determined by analyzing the ultrasonic signal sensed from wire 204. Moreover, embodiments including a first diaphragm 198 and a second diaphragm 200 may be configured to compensate for one or more environmental conditions. For example, sensor 190 may be configured to determine a pressure of a sensing location, and the dual diaphragms of sensor 190 may compensate for vibration in the sensing location because each diaphragm may be exposed to the vibration.

Figure 10:
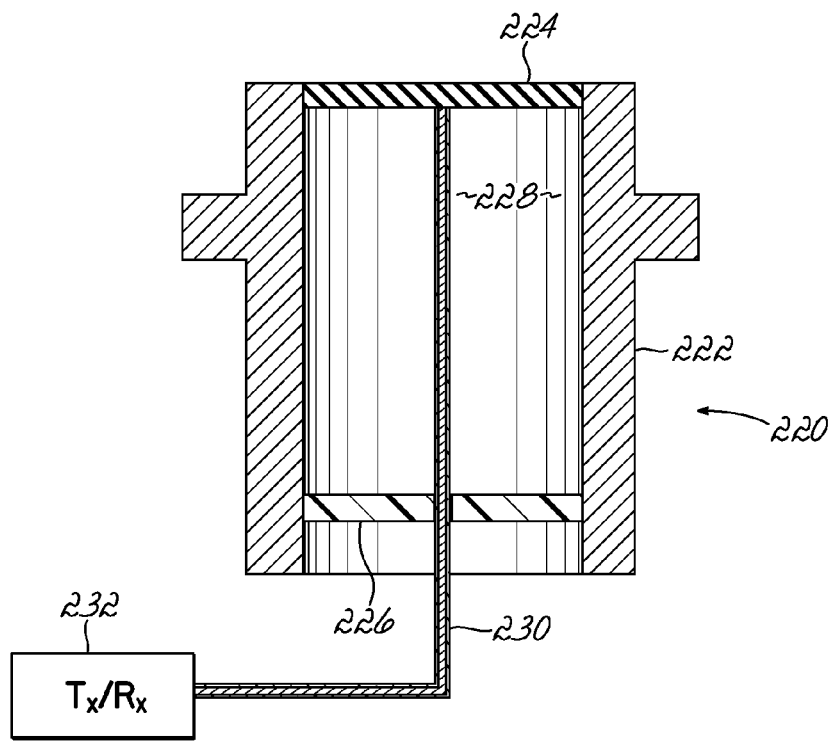
FIG. 10 is a cross sectional view of a sensor consistent with some embodiments of the invention.

Referring to FIG. 10, a cross sectional view of a sensor 220 consistent with some embodiments of the invention is provided. Sensor 220 includes a housing 222, a diaphragm 224, and an attachment plate 226, such that an interior 228 may be defined. Sensor 220 may include a wire 230, where at least a portion of wire 230 may be coupled in tension between the diaphragm 224 and the attachment plate 226 and positioned in interior 228. As discussed above, one or more ultrasonic signal transmission characteristics of wire 230 may vary as the tension of the portion of wire 230 coupled in tension between the diaphragm 224 and the attachment plate 230 changes. As shown in FIG. 10, sensor 220 may include transmitting and receiving circuitry 232 (i.e. transceiving circuitry) operatively connected to wire 230. Transceiving circuitry 232 may comprise transmitting circuitry and receiving circuitry operatively connected to a common end of wire 230. In other embodiments, transceiving circuitry 232 may comprise transmitting and receiving circuitry commonly configured together.

In embodiments including a common transmitting and receiving end, such as the sensor shown in FIG. 10, a pulse/echo transmitting and sensing method may be utilized. In these embodiments, an ultrasonic signal may be transmitted through wire 230, and an ultrasonic signal may be sensed from wire 230, where the sensed ultrasonic signal may comprise an echo of the transmitted ultrasonic signal. As such, analysis of the sensed ultrasonic signal to determine a pressure measurement associated with a force acting on diaphragm 224 may include comparing the transmitted ultrasonic signal to the sensed echo. As the ultrasonic signal transmission characteristics of wire 230 may vary as the tension of the tensioned portion of wire 230 changes in response to the force on the diaphragm 224, the transmitted ultrasonic signal may include one or more signal characteristics that differ from the sensed echo. The transmitted ultrasonic signal and the sensed echo may therefore be analyzed to determine one or more signal characteristics that vary between the transmitted ultrasonic signal and the sensed echo, and may therefore determine one or more ultrasonic signal transmission characteristics of wire 230 that varied in response to the change in tension of the tensioned portion of wire 230.

Based at least in part on the determined variance of at least one ultrasonic signal transmission characteristic of wire 230, a measurement of the pressure associated with the force acting on the diaphragm 224 may be determined. As such, some embodiments, a sensor utilizing a pulse/echo ultrasonic signal transmission and sensing method may determine a measurement of a pressure associated with a force acting on diaphragm 224.

Figure 11:
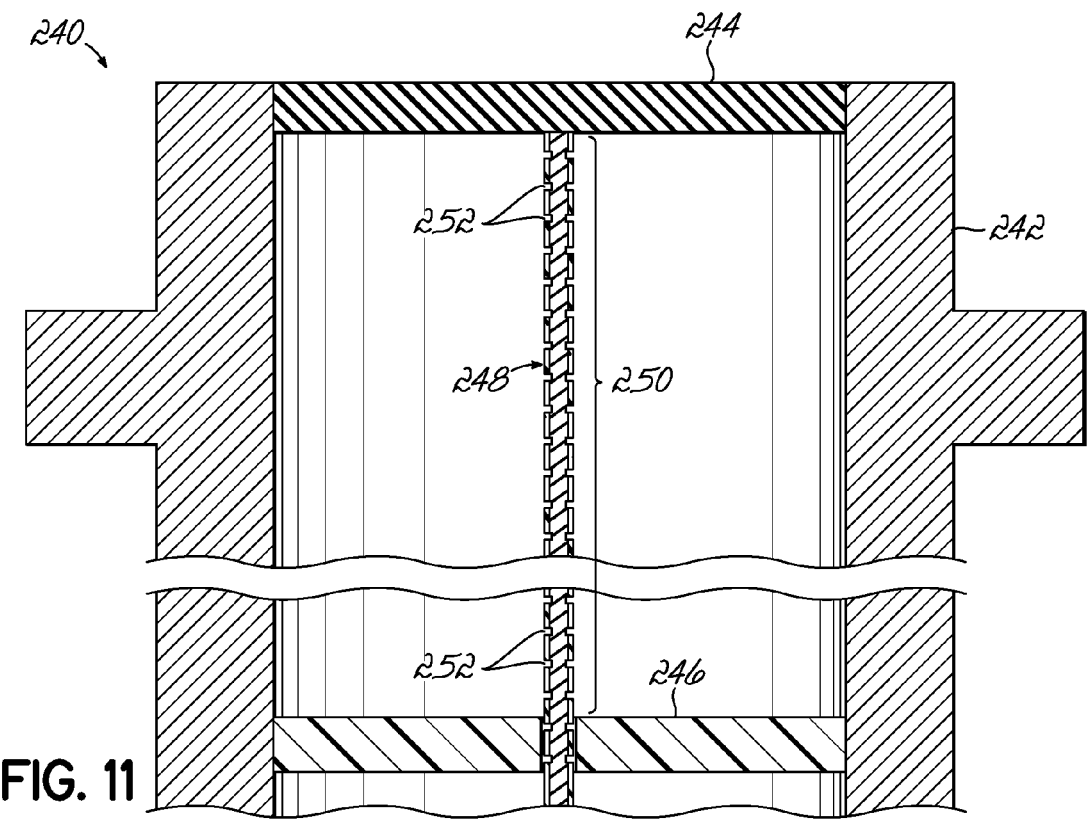
FIG. 11 is a cross sectional view of a sensor consistent with some embodiments of the invention.

Referring now to FIG. 11, a cross-sectional view sensor 240 consistent with some embodiments of the invention is provided. Sensor 240 includes a housing 242 having a first end and a second end, a diaphragm 244 coupled to the housing 242 proximate the first end, and an attachment plate 246 coupled to the housing 242 proximate the second end, such that an interior is defined by the housing 242, the diaphragm 244 and the attachment plate 246. Sensor 240 includes wire 248, where wire 248 includes a portion 250 coupled in tension between the diaphragm 244 and attachment plate 246. Wire 248 includes a plurality of reflection points 252 uniformly spaced along portion 250. Reflection points 252 include a resonant frequency such that when an ultrasonic signal comprising a frequency band including the resonant frequency may be transmitted through wire 248, the reflection points 252 may reflect a signal comprising the resonant frequency. The resonant frequency of reflection points 252 varies as the tension of portion 250 changes. In some embodiments, an ultrasonic signal comprising a desired wavelength may be transmitted through wire 248, and reflection points 252 are uniformly spaced along portion 250 at a distance comprising half the wavelength of the transmitted ultrasonic signal. In these embodiments, as the reflection points 252 are uniformly spaced half the wavelength of the transmitted ultrasonic signal, the reflected signal from each reflection point 252 will be in phase, because each reflected signal will be reflected half a wavelength apart and each reflected signal reflected from a reflection point 252 positioned further along the portion 250 will travel half a wavelength further, such that a combined reflected signal comprising the resonant frequency of the reflection points 252 may be sensed on wire 248. In response to a change in tension, the spacing between the reflection points 252 may change, and as the uniform spacing changes, the resonant frequency of the reflection points 252 may change.

As described with regard to measuring a pressure of a sensing location, a pressure may exert a force on diaphragm 244, thereby causing a deflection of diaphragm 244. In response to the deflection of diaphragm 244, the tension of portion 250 may change. In some embodiments, in response to the change in tension of portion 250, the uniform spacing between the reflection points 252 may change, such that the resonant frequency of the reflection points 252 may change. As such, in these embodiments, the pressure associated with the force on diaphragm 244 may be measured based at least in part on the resonant frequency of the reflection points 252. To determine the pressure, an ultrasonic signal may be transmitted through wire x248. The transmitted ultrasonic signal comprises a frequency band, where the frequency band includes a range of frequencies possible for the resonant frequency of the reflection points 252. As diaphragm 244 deflects in response to the force caused by the pressure, the tension of portion 250 may change, and the resonant frequency of the reflection points 252 may vary. In these embodiments, depending on the pressure of the system, each reflection point 252 may reflect a reflected signal, and the combined reflected signal may be sensed. The combined reflected signal may be analyzed to determine a measurement associated with the pressure.

Reflection points 252 may comprise for example, cylindrical grooves in wire 248, one or more materials deposited on wire 248, one or more materials incorporated into wire 248, such that the reflection points are configured to reflect a signal of a resonant frequency, where the resonant frequency of the reflected signal may vary with the tension on portion 250.

Figure 12:
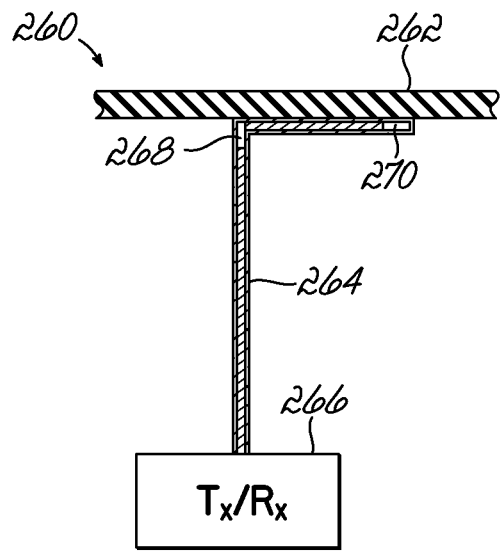
FIG. 12 is a cross sectional view of a sensor consistent with some embodiments of the invention.

Referring now to FIG. 12 which provides a sensor 260 including a measuring surface 262 and a wire 264 at least a portion of which is coupled to the measuring surface 262, such that one or more ultrasonic signal transmission characteristics of the coupled portion of wire 264 may vary as measuring surface 262 interacts with one or more environmental conditions. Sensor 260 further includes transceiving circuitry 266 operatively connected to wire 264. As shown in FIG. 12, wire 264 includes a first reflection point 268 and a second reflection point 270 located on the portion of wire 264 coupled to measuring surface 262, where the first reflection point 268 and the second reflection point 270 are configured to reflect a portion of an ultrasonic signal transmitted through wire 264.

In some embodiments, transceiving circuitry 266 may transmit an ultrasonic signal through wire 264. Based at least in part on the transmitted ultrasonic signal, first reflection point 268 may reflect a first reflected ultrasonic signal back to transceiving circuitry 266, and based at least in part on the transmitted ultrasonic signal, second reflection point 270 may reflect a second reflected ultrasonic signal back to transceiving circuitry 266. A controller operatively connected to transceiving circuitry 266 may analyze the first reflected signal and the second reflected signal to determine a variance in one or more signal characteristics between the first reflected signal and the second reflected signal, including for example, phase change, amplitude change, frequency change, and/or propagation delay. Based at least in part on the determined variance in the one or more signal characteristics between the first reflected signal and the second reflected signal, a variance in one or more ultrasonic signal transmission characteristics of the coupled portion of wire 264 may be determined. For example, the transmission path length of the tensioned portion of wire 264 may be determined by determining the phase change between the first reflected signal and the second reflected signal.

In some embodiments of sensors consistent with the sensor 260 of FIG. 12, the portion of wire 264 coupled to measuring surface 262 may be coupled in tension to measuring surface 262. In these embodiments, the tensional force on the portion of wire 264 coupled in tension to the measuring surface 262 may vary as a strain on measuring surface 262 changes. For example, if a force acted on measuring surface 262, thereby causing a strain on measuring surface 262, the tensional force of the coupled portion of wire 264 may vary. In some embodiments, the first reflected signal and the second reflected signal may be analyzed to determine the tension of the coupled portion of wire 264. In some embodiments, a strain associated with measuring surface 262 may be determined based at least in part on the determined tension of the coupled portion of wire 264. In addition, as the tensional force of the coupled portion of wire 264 may vary, the transmission path length of the tensioned portion of wire 264 may vary. In some embodiments, a strain associated with measuring surface 262 may be determined based at least in part on the determined transmission path length of the tensioned portion of wire 264.

In some embodiments of sensors consistent with the sensor 260 of FIG. 12, the portion of wire 264 coupled to measuring surface 262 may not be coupled in tension to measuring surface 262. In these embodiments, an ultrasonic transmission path length of the coupled portion of wire 264 may vary as a temperature associated with the measuring surface 262 changes due to thermal expansion. In some embodiments, the first reflected signal and the second reflected signal may be analyzed to determine the transmission path length of the coupled portion of wire 264. Based at least in part on the determined transmission path length of the coupled portion of wire 264, a temperature associated with the measuring surface may be determined.

In some embodiments of sensors consistent with the sensor 260 of FIG. 12, the portion of wire 264 coupled to measuring surface 262 may be coupled in tension, and the tensional force on the portion of wire 264 coupled in tension to the measuring surface 262 may vary as measuring surface 262 vibrates. In some embodiments, the first reflected signal and the second reflected signal may be analyzed to determine the tension of the coupled portion of wire 264. Based at least in part on the determined tension of the coupled portion of wire 264, the vibration of measuring surface 262 may be determined. The first reflected signal and the second reflected signal may be analyzed to determine the transmission path length of the coupled portion of wire 264. In some embodiments, the vibration of measuring surface 262 may be determined based at least in part on the determined transmission path length of the coupled portion of wire 264.

Additional embodiments consistent with the invention are contemplated. For example, referring to FIG. 12, the coupled portion of wire 264 may be coupled in tension along a first section and not coupled in tension along a second section, and may further include a third reflection point along the coupled portion. As such, in some embodiments, sensors configured to measure temperature, strain, and/or vibration are contemplated by including additional reflection points and coupled sections. Moreover, embodiments consistent with the invention may include additional portions coupled in tension and/or not coupled in tension including additional reflection points, such that multiple temperature, strain, and/or vibration measurements associated with one or more locations of one or more measuring surfaces may be determined using one or more wires. As such, in some embodiments, sensors consistent with embodiments of the invention may analyze reflected signals from a plurality of reflection points coupled to a plurality of measuring surfaces positioned to measure one or more environmental conditions of a sensing location.

Alternative embodiments not described in detail are contemplated. In some embodiments, ultrasonic signal transmission and sensing of one or more wires of a sensor consistent with embodiments of the invention may include pulse/echo ultrasonic signal methods. In one aspect consistent with some embodiments, a controller may transmit an ultrasonic signal through a wire, and the controller may sense the echo of the transmitted ultrasonic signal. In some embodiments, the controller may analyze the sensed echo of the transmitted ultrasonic signal to determine the variance between the transmitted ultrasonic signal and the sensed echo of the transmitted ultrasonic signal. Furthermore, in some embodiments, a sensor may include a thermocouple operatively connected to a controller, and the controller may be configured to sense a voltage of a signal generated by the thermocouple, and the controller may determine a temperature associated with the sensor based at least in part on the voltage of the signal generated by the thermocouple.

Furthermore, FIGS. 1-11 illustrate embodiments comprising cylindrical housings; however the invention is not so limited. For example, sensors consistent with some embodiments of the invention may comprise triangular, quadragonal, pentagonal, hexagonal, heptagonal, octagonal, nonagonal, or decagonal. Moreover, sensors consistent with embodiments of the invention may include housings wherein the interior may not be entirely encompassed by the housing, diaphragm, and attachment plate. For example, an attachment plate of some embodiments may not couple to a housing at all boundaries, such that an attachment plate may comprise a structure configured to couple one or more wires in tension between the diaphragm, but may not entirely enclose the interior.

Figure 13:
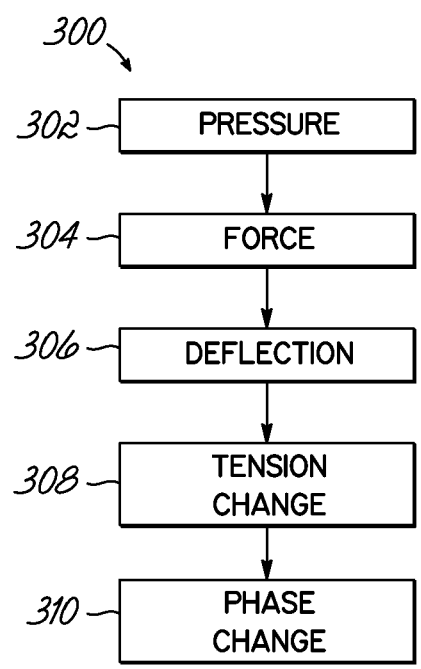
FIG. 13 is a flow chart illustrating a sequence of correlated relationships consistent with sensors of FIGS. 1-12.

FIG. 13 is a flowchart 300 illustrating a sequence of operations consistent with embodiments of the sensors described above in FIGS. 1-9 and sensing method of the invention. As shown in FIG. 13, a pressure associated with a sensing location (block 302) may cause a force (block 304) to act on a sensor consistent with embodiments of the invention. The force (block 304) acting on a sensor may cause a deflection (block 306) of a measuring surface in a sensor consistent with embodiments of the invention. In some embodiments, at least a portion of a wire may be coupled in tension to the measuring surface of the sensor, such that a deflection of the measuring surface may cause the tension of the tensioned portion to change in response to the deflection of the measuring surface (block 308). The change in tension of the tensioned portion of the wire may cause one or more ultrasonic signal transmission characteristics of the wire to change, which may lead to differences between characteristics of a reference ultrasonic signal and a sensed ultrasonic signal. As such, the change in tension of the wire may cause a phase change of an ultrasonic signal as compared to a reference ultrasonic signal (block 310). The change in tension of the wire may be measured by sensing ultrasonic signals from the wire and determining one or more characteristics of the sensed ultrasonic signal that varied due to the change in tension of the wire. In some embodiments, the phase change, amplitude change, frequency change, and/or propagation time of an ultrasonic signal sensed from the wire as compared to a reference ultrasonic signal may be used to determine the change in tension of the wire, change in path length of the wire, deflection of the measuring surface, force on the measuring surface, and/or pressure of the sensing location.

FIGS. 14-18 illustrate sequences of operations consistent with sensing methods of the present invention and associated with the sensors consistent with the invention. Moreover, ultrasonic transmission circuitry, ultrasonic receiving circuitry, and/or controller may be configured to perform some operations included in FIGS. 14-18. Ultrasonic transmission circuitry, ultrasonic receiving circuitry, and controllers configured to perform one or more operations of FIGS. 14-18 may include special purpose microcontrollers, general purpose microcontrollers, general and special purpose computers, and other processing circuitry, and the sequences of operations may be implemented using software, firmware, or in dedicated hardware. Implementation of the sequences of operations disclosed in these figures in practically any combination of hardware, firmware and/or software, using either special purpose or general purpose electronic circuitry, would be well within the capabilities of one of ordinary skill in the art having the benefit of the instant disclosure.

Figure 14:
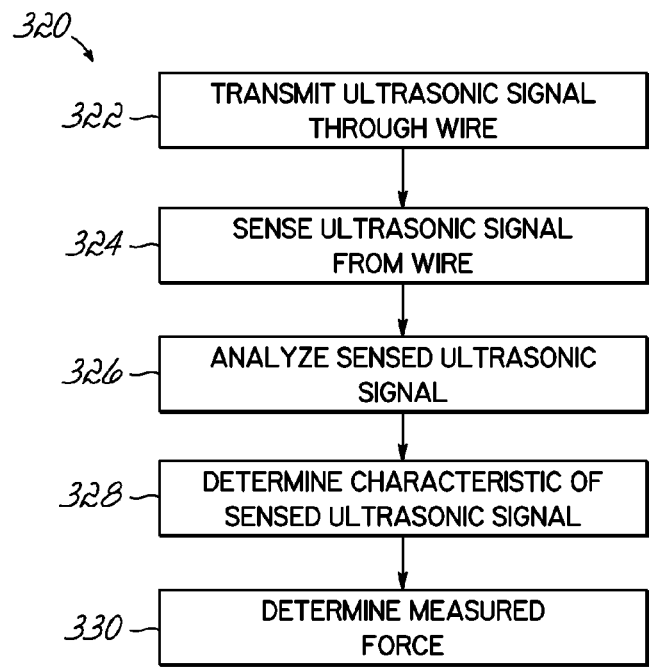
FIG. 14 is a flow chart illustrating a sequence of steps that may be performed utilizing a sensor of FIGS. 1-12.

FIG. 14 is a flowchart 320 illustrating a sequence of operations consistent with embodiments of the invention. To measure a force, an ultrasonic signal may be transmitted through a wire of a sensor (block 322). Consistent with the embodiments of the invention, the sensor may comprise a housing having a first end and second end, a diaphragm proximate the first end and coupled to the housing, an attachment plate coupled to the housing proximate the second end, such that an interior is defined within the housing and between the diaphragm and attachment plate, and a wire where at least a portion of the wire may be coupled in tension between the diaphragm and the attachment plate. An ultrasonic signal may be sensed from the wire (block 324), and the ultrasonic signal may be analyzed (block 326). One or more characteristics of the sensed ultrasonic signal may be determined (block 328), and based at least in part on the determined characteristics of the sensed ultrasonic signal, the measurement of the force may be determined (block 330).

In some embodiments consistent with the invention, the ultrasonic signal sensed in block 324 may be based at least in part on the ultrasonic signal transmitted in block 322, where one or more characteristics of the sensed ultrasonic signal may vary as compared to the transmitted ultrasonic signal due to the force the sensor is configured to measure.

Figure 15:
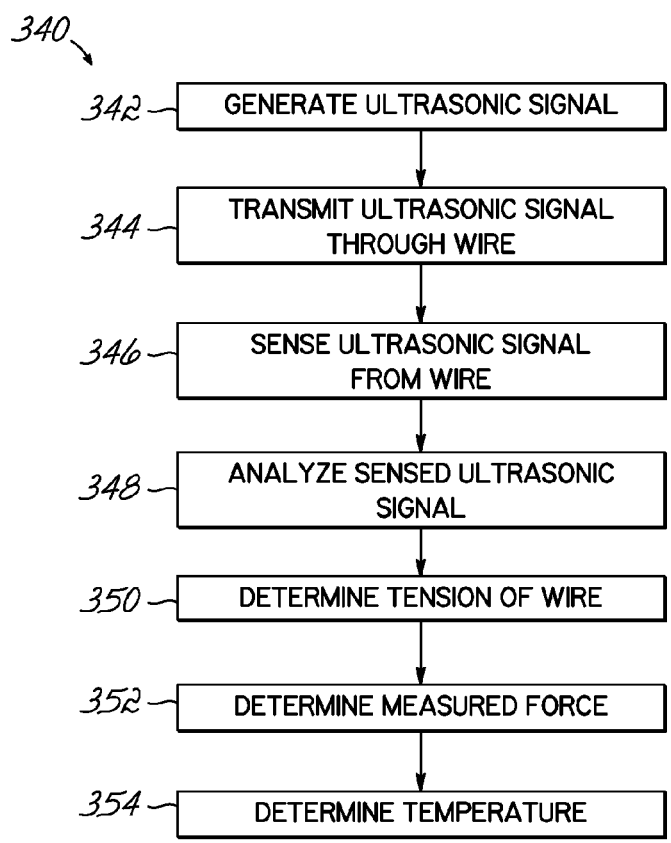
FIG. 15 is a flow chart illustrating a sequence of steps that may be performed by a sensor consistent with some embodiments of the invention.

FIG. 15 is a flowchart 340 illustrating a sequence of operations consistent with embodiments of the invention. To measure a force using a sensor, consistent with embodiments of the invention, an ultrasonic signal may be generated (block 342), and the ultrasonic signal may be transmitted through a wire of the sensor (block 344). An ultrasonic signal may be sensed from the wire (block 346), and the ultrasonic transmission signal may be analyzed (block 348). Based at least in part on the analysis of the sensed ultrasonic signal, the tension of the wire may be determined (block 350). Based at least in part on the determined tension, the force may be determined (block 352). Furthermore, a temperature associated with the sensor may be determined (block 354).

Figure 16:
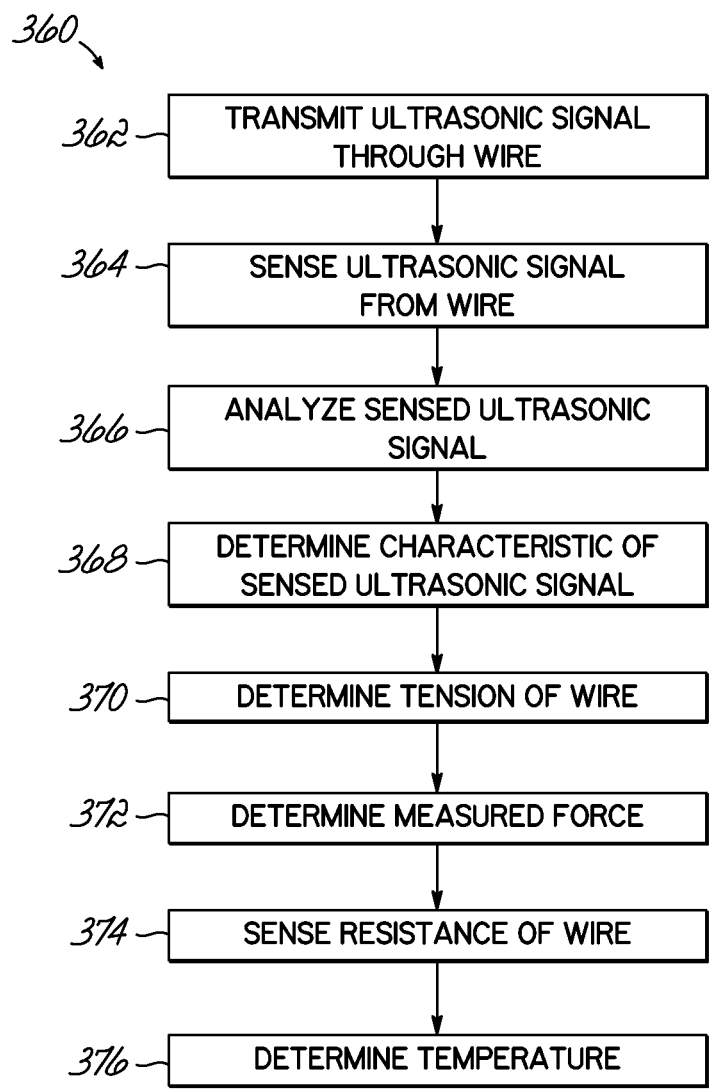
FIG. 16 is a flow chart illustrating a process that may be performed utilizing a sensor of FIGS. 1-9.

FIG. 16 is a flowchart 360 illustrating a sequence of operations consistent with embodiments of the invention. To measure a force using a sensor, consistent with embodiments of the invention, an ultrasonic signal may be transmitted through a wire of the sensor (block 362), and an ultrasonic signal may be sensed from the wire (block 364). The sensed ultrasonic signal may be analyzed (block 366) to determine one or more characteristics of the sensed ultrasonic signal (block 368). Based at least in part on the determined characteristics of the sensed ultrasonic signal, the tension of the wire may be determined (block 370). Based at least in part on the determined tension, the force may be measured (block 372). The resistance of the wire may be sensed (block 374), and based at least in part on the sensed resistance of the wire, a temperature associated with the sensor may be determined (block 376).

In some embodiments, the ultrasonic signal sensed from the wire of the sensor may be compared to a reference ultrasonic signal, and the analysis of the sensed ultrasonic signal (block 366) may include comparing the sensed ultrasonic signal to the reference ultrasonic signal. In some embodiments, the reference ultrasonic signal may include the transmitted ultrasonic signal, an ultrasonic signal sensed from the wire while the sensor was positioned in an ambient environment, an ultrasonic signal sensed from the wire at a defined pressure, an ultrasonic signal sensed from the wire at a defined deflection of the measuring surface, and/or an ultrasonic signal sensed from the wire at a defined tension. In addition, in some embodiments, changes in one or more ultrasonic signal transmission characteristics of the wire may be determined by comparing the sensed ultrasonic signal to the reference ultrasonic signal. The varying ultrasonic signal transmission characteristics may include phase change, amplitude change, frequency change, frequency band change, and/or propagation time. In turn, one or more measurements associated with the wire may be determined based at least in part on the determined variance of the ultrasonic signal transmission characteristics. The measurements associated with the wire that may be determined based at least in part on the determined variance of the ultrasonic signal transmission characteristics includes the transmission path length of the wire, the tension of the wire, the strain on the wire, and/or the resistance of the wire.

Figure 17:
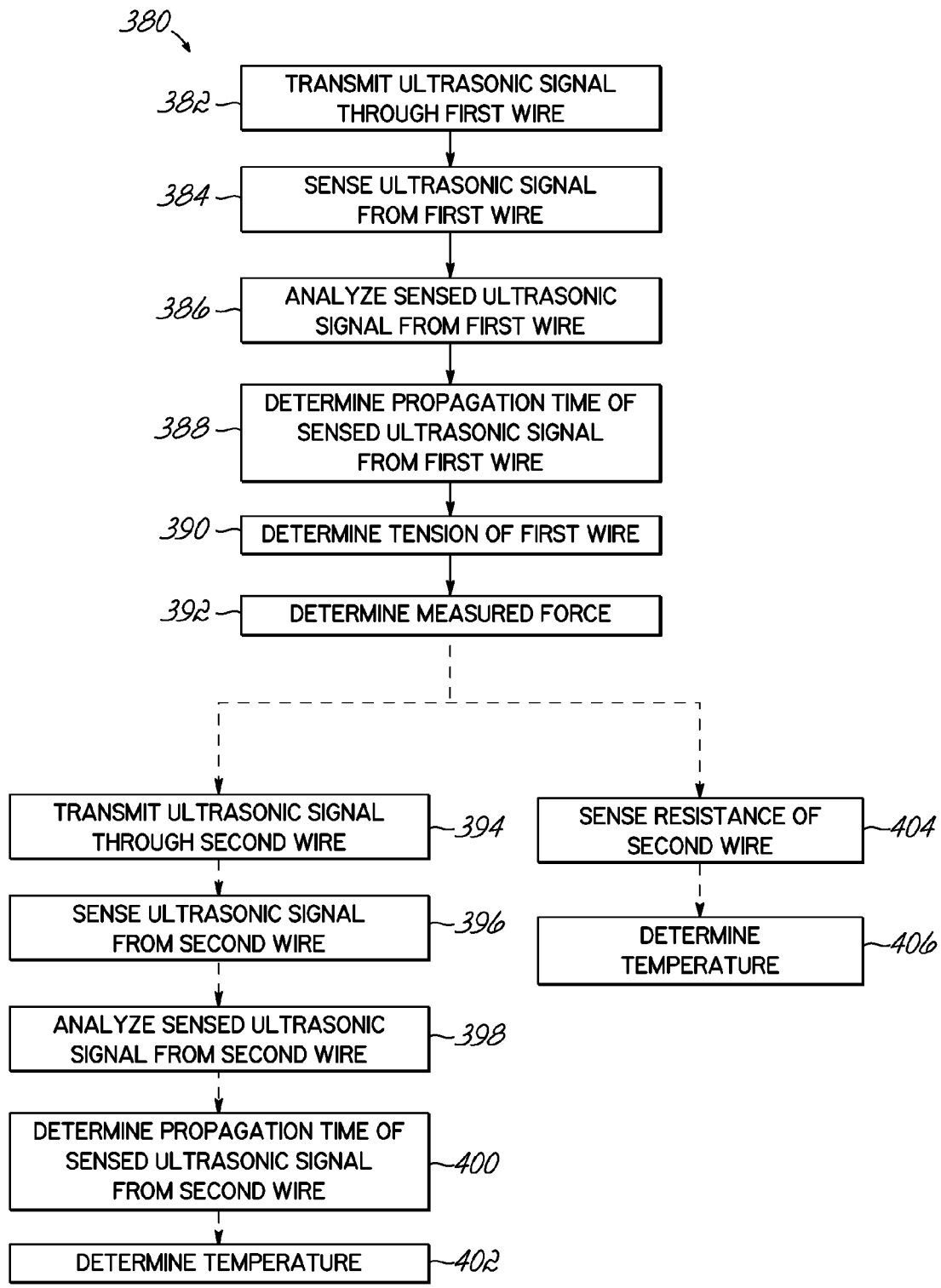
FIG. 17 is a flow chart illustrating a sequence of steps that may be performed by a sensor consistent with some embodiments of the invention.

Referring now to FIG. 17, FIG. 17 is a flowchart 380 illustrating steps consistent with some embodiments of the invention. In FIG. 14, a force may be measured with a sensor, where the sensor includes a housing having a first and second end, a diaphragm coupled to the housing proximate the first end, an attachment plate coupled to the housing proximate the second end, and the housing, diaphragm and attachment plate define an interior. The sensor further includes a first wire coupled in tension between the attachment plate and the diaphragm and a second wire coupled to the attachment plate and configured in the interior. An ultrasonic signal may be transmitted through the first wire (block 382), and an ultrasonic signal may be sensed from the first wire (block 384). The sensed ultrasonic signal may be analyzed (block 386) to determine the propagation time of the sensed ultrasonic signal from the first wire (block 388). Based at least in part on the determined propagation time of the sensed ultrasonic signal from the first wire, the tension of the first wire may be determined (block 390). Based at least in part on the propagation time of the sensed ultrasonic signal from the first wire and/or the determined tension of the first wire, the force may be measured (block 392).

In some embodiments, an ultrasonic signal may be transmitted through the second wire (block 394), and an ultrasonic signal may be sensed from the second wire (block 396). The sensed ultrasonic signal from the second wire may be analyzed (block 398) to determine the propagation time of the sensed ultrasonic signal from the second wire (block 400). Based at least in part on the determined propagation time of the sensed ultrasonic signal from the second wire, a temperature associated with the sensor may be determined (block 402). In some embodiments, the resistance of the second wire may be sensed (block 404), and based at least in part on the sensed resistance, a temperature associated with the sensor may be determined (block 406).

In some embodiments, an ultrasonic signal may be transmitted through the first wire and an ultrasonic signal may be transmitted through the second wire substantially in parallel (i.e. block 382 and block 394 may occur substantially in parallel). Moreover, in some embodiments, the ultrasonic signal transmitted through the first wire and the ultrasonic signal transmitted through the second wire may be a common ultrasonic signal transmitted from an ultrasonic signal transmitter operatively connected to both the first and second wires.

In some embodiments consistent with the invention, a pressure (i.e. a force over an area) may be determined based at least in part on the analysis of an ultrasonic signal transmitted through the tensioned wire. However, in some environments in which a sensor may be deployed, the pressure of the environment may not be the only environmental condition that may cause the ultrasonic signal transmission characteristics of the tensioned wire to vary. For example, a temperature associated with the sensor may cause thermal expansion of the tensioned wire, which may cause one or more ultrasonic signal transmission characteristics to vary. In some embodiments, sensors and sensing methods of the invention determine temperatures associated with the sensor such that the variance of the ultrasonic signal transmission characteristics due to the temperature may be determined, and a temperature compensated pressure measurement may be determined based at least in part on the determined temperature associated with the sensor and the sensed ultrasonic signal from the tensioned wire.

Figure 18:
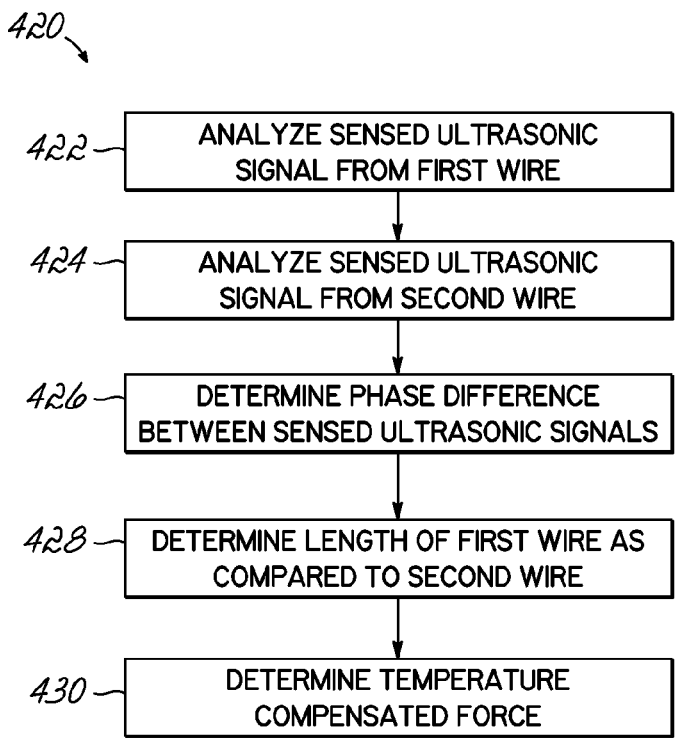
FIG. 18 is a flow chart illustrating a sequence of steps that may be performed by a sensor consistent with some embodiments of the invention.

Referring to FIG. 18, which provides a flowchart 420, FIG. 18 illustrates a sequence of operations consistent with embodiments of the invention for measuring a force using a sensor consistent with embodiments of the invention. An ultrasonic signal sensed from the first wire is analyzed (block 422), and an ultrasonic signal sensed from the second wire is analyzed (block 424). The phase difference between the sensed ultrasonic signals may be determined using signal processing methods (block 426). As the first wire is in tension, the path length of the first wire may vary in response to the force due to pressure on the diaphragm and thermal expansion due to a temperature associated with the sensor. The path length of the second wire, not being in tension, may vary in response to thermal expansion due to a temperature associated with the sensor. As, such, the change in path length of first wire may be offset by the change in path length of the second wire, such that the change in path length of wire one due to thermal expansion may be separated from the change in path length of wire one due to a force on the diaphragm (block 428). As such, in some embodiments, a temperature compensated force measurement may be determined (block 430).

Figure 19:
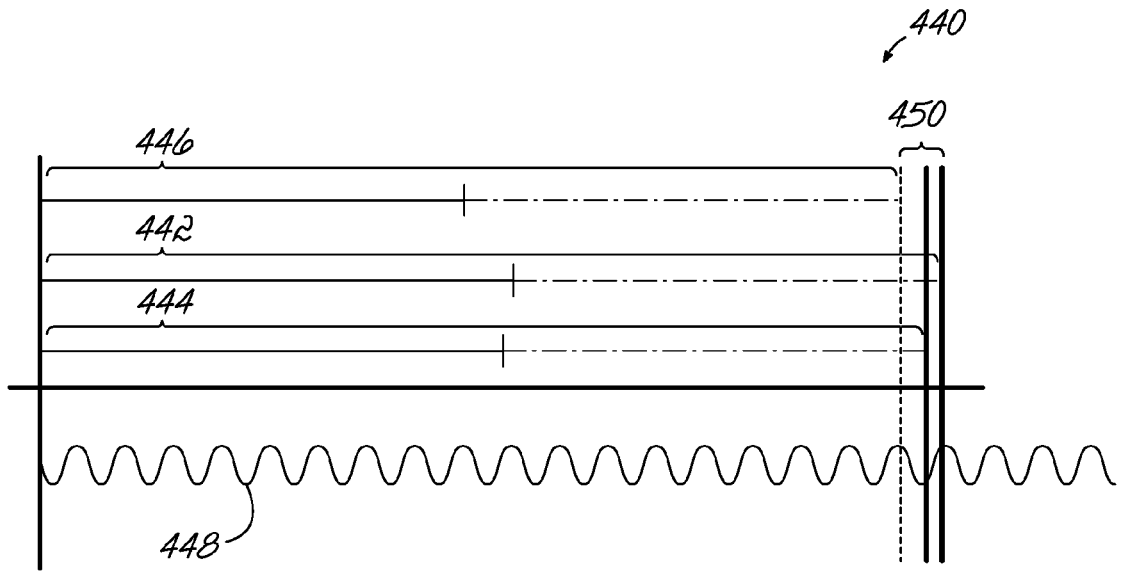
FIG. 19 is an exemplary diagram illustrating transmission path lengths of wires included in sensors consistent with embodiments of the invention.

FIG. 19 is an exemplary diagram 440 illustrating the transmission path lengths of the sensor of FIG. 3. FIG. 19 illustrates the transmission path length of the first wire 442 at ambient environmental conditions, the transmission path length of the first wire for the relevant force measurement 444, and the transmission path length of the second wire for the relevant force measurement 446. As shown, the transmission path length of the first wire at ambient environmental conditions 442 may be longer than both the transmission path length of the transmission path length of the first wire for the relevant force measurement 444 and the transmission path length of the second wire for the relevant force measurement 446. As discussed above, as a force acts on the diaphragm, the transmission path length of the first wire may shorten, as shown at reference 444. Moreover, as discussed above, the transmission path length of the second wire may be used to determine a temperature associated with the sensor, such that the thermal expansion of the first wire, thereby increasing the transmission path length may be offset from the determined force measurement. As discussed above, and as shown in FIG. 16, the transmission path lengths of the first wire at ambient conditions 442, the first wire for the relevant force measurement 444, and the second wire for the relevant force measurement 446 may be determined by analyzing an ultrasonic signal, such as exemplary ultrasonic signal 448. Reference lines 450 illustrate the transmission path length differences, and analysis of the sensed ultrasonic signals, such as exemplary ultrasonic signal 448 using known signal processing methods may determine the phase difference of the sensed ultrasonic signals, which in turn may be used to determine the transmission path length differences.

Figure 20:
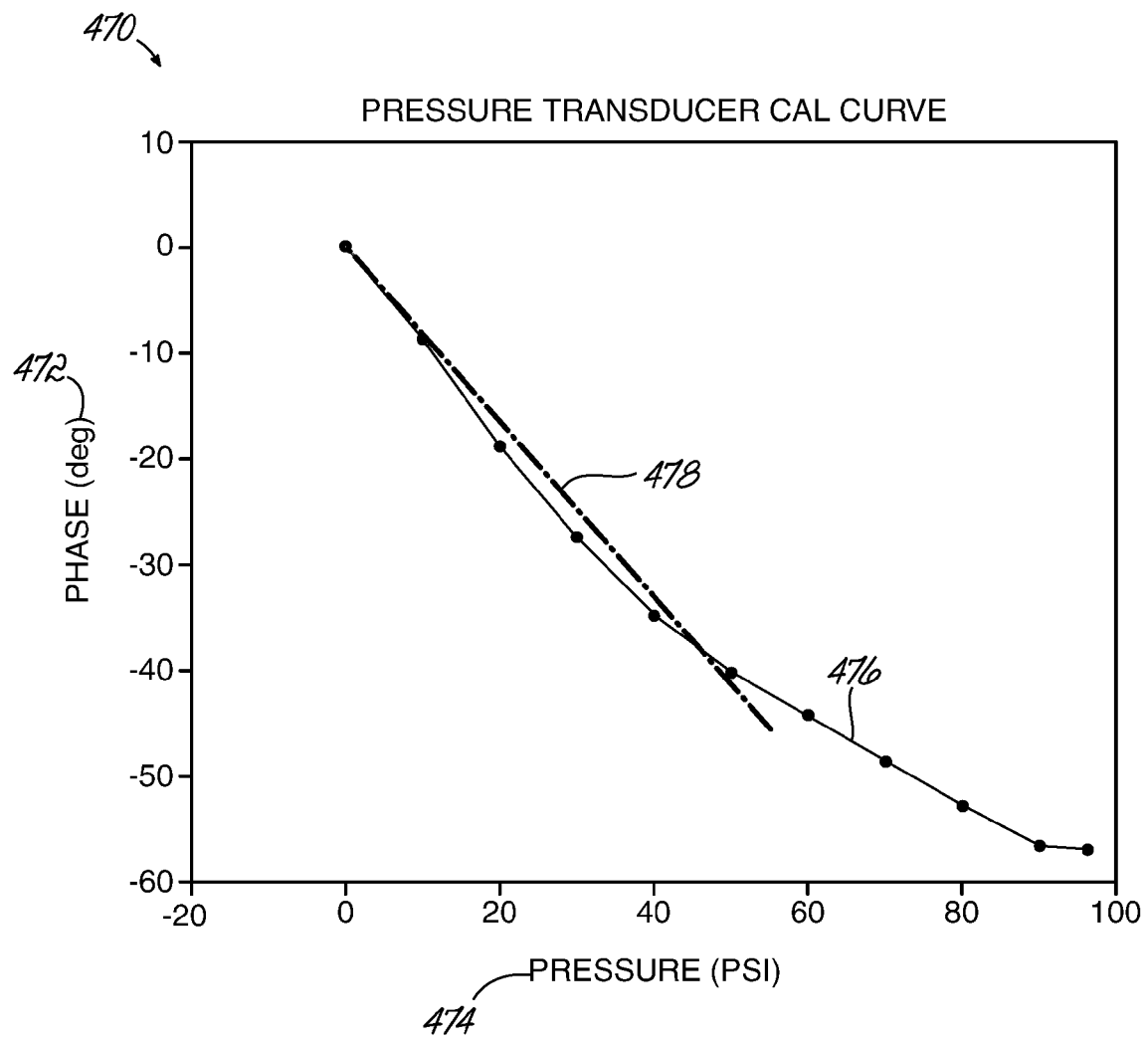
FIG. 20 is an exemplary chart providing experimental data related to phase and pressure measurements using a sensor and sensing methods consistent with some embodiments of the invention.

FIG. 20 provides an exemplary chart 470 illustrating experimental data from embodiments of the invention. Chart 470 provides a pressure measurement 474 as a function of phase 472, where phase 472 may be the phase difference between sensed ultrasonic signals of the sensors and sensing methods described above. Data line 476 provides collected data, and data line 478 provides a theoretical data line.

While the present invention has been illustrated by a description of the various embodiments and examples, and while these embodiments have been described in considerable detail, it is not the intention of the applicants to restrict or in any way limit the scope of the appended claims to such detail. Additional advantages and modifications will readily appear to those skilled in the art. For example, while the attachment plates, housings, and diaphragms of some embodiments consistent with the invention have been described as individually defined components, embodiments comprising a housing, attachment plate, and/or diaphragm integrally formed as substantially uniform are contemplated. As such, in some embodiments, a sensor may comprise a housing including a diaphragm, and/or an attachment plate formed thereon.

Moreover, while attachment plates consistent with some embodiments of the invention may be configured as shown for example in FIGS. 1-3, other configurations are contemplated. As such, attachment plates consistent with some embodiments of the invention are configured to secure one or more wires in tension, and may be configured in any suitable manner for providing attachment points for such wires. Thus, an attachment plate consistent with the invention need not be a separate planar member as shown in FIGS. 1-3, but instead may have other geometries, and may be disposed integrally on a housing or other component in a sensor. Practically any component that provides a point of attachment for a wire may be used as an attachment plate in embodiments consistent with the invention.

Moreover, sensors and sensing methods consistent with the invention may be used in sensing environments that conventional sensors and sensing methods generally provide inaccurate results and/or fail completely. Embodiments consistent with the invention may be utilized in a variety of applications where the sensing locations typically are too harsh for conventional sensors and/or sensing methods. Harsh sensing environments typically include one or more extreme environmental conditions that cause inaccurate readings and/or failure of conventions sensors, extreme environmental conditions generally problematic for conventional sensors include, for example, high temperature, high pressure, high strain, high vibrations, wide variations in temperature during operation (i.e. broad temperature range), wide variations in pressure during operation (i.e. broad pressure range), etc. As such, sensors and sensing methods consistent with the invention may be utilized in such harsh sensing environments including, for example, high temperature, pressure, vibration, and/or strain locations in engines (e.g. combustion chambers of aero gas turbine engines), high temperature, pressure, vibration, and/or strain locations in industrial machinery, etc.

As sensors and sensing methods consistent with the invention may transmit ultrasonic signals through wires of substantial length, controllers and or other devices used to analyze the ultrasonic signals to determine a measurement of one or more environmental conditions of a harsh sensing location may be remote from the harsh sensing location thereby increasing the reliability of components that may be particularly sensitive to the environmental conditions of the harsh sensing location. Therefore, sensors and sensing methods consistent with the invention may be utilized in a wide variety of applications to provide improved sensors and sensing methods as compared to conventional sensors and sensing methods. In addition, sensors and sensing methods consistent with the invention may be utilized in a wide variety of applications where conventional sensing technology is unreliable, inaccurate and/or inoperable. Thus, the invention in its broader aspects is therefore not limited to the specific details and representative apparatuses shown and described. Accordingly, departures may be made from such details without departing from the spirit or scope of applicants' general inventive concept.

What is claimed is:

1. A sensor, comprising:
a housing having a first end and a second end;
a diaphragm proximate the first end and coupled to the housing;
an attachment plate coupled to the housing such that an interior is defined within the housing and between the diaphragm and the attachment plate;
transmitting circuitry configured to generate an ultrasonic signal, the ultrasonic signal comprising an ultrasonic mechanical wave; and
a wire coupled in tension between the attachment plate and the diaphragm such that the wire exhibits a varying ultrasonic signal transmission characteristic as the tension between the attachment plate and the diaphragm changes, the wire coupled to receive the ultrasonic signal generated by the transmitting circuitry for use in measuring an environmental condition based on the varying ultrasonic signal transmission characteristic.

2. The sensor of claim 1, further comprising:
a securing member extending from the diaphragm into the interior, the wire tensioned between the attachment plate and the securing member.

3. The sensor of claim 1, wherein the wire is mounted to the diaphragm.

4. The sensor of claim 2, wherein the securing member comprises a hook.

5. The sensor of claim 2, wherein the securing member comprises an eyelet.

6. The sensor of claim 2, wherein the securing member comprises a set screw.

7. The sensor of claim 1, wherein the diaphragm is integral to the housing.

8. The sensor of claim 1, wherein the diaphragm is attached to the housing.

9. The sensor of claim 8, wherein the diaphragm is fastened to the housing.

10. The sensor of claim 8, wherein the diaphragm is welded to the housing.

11. The sensor of claim 8, wherein the diaphragm is soldered to the housing.

12. The sensor of claim 8, wherein the diaphragm is brazed to the housing.

13. The sensor of claim 1, wherein the varying ultrasonic signal transmission characteristic includes phase of the ultrasonic signal.

14. The sensor of claim 1, wherein the varying ultrasonic signal transmission characteristic includes amplitude of the ultrasonic signal.

15. The sensor of claim 1, wherein the varying ultrasonic signal transmission characteristic includes frequency of the ultrasonic signal.

16. The sensor of claim 1, wherein the varying ultrasonic signal transmission characteristic includes propagation delay of the ultrasonic signal.

17. The sensor of claim 1, wherein at least a portion of the interior is a cavity pressurized to be above atmospheric pressure.

18. The sensor of claim 1, wherein at least a portion of the interior is a cavity depressurized to be below atmospheric pressure.

19. The sensor of claim 1, wherein at least a portion of the interior is a cavity pressurized to be at about atmospheric pressure.

20. The sensor of claim 1, wherein the attachment plate is proximate the second end.

21. The sensor of claim 1, wherein the attachment plate is located between the first and second ends within the housing.

22. The sensor of claim 1, wherein the housing is configured to be substantially cylindrical.

23. The sensor of claim 1, wherein the housing is configured to be at least one of triangular, quadragonal, pentagonal, hexagonal, heptagonal, octagonal, nonagonal, or decagonal.

24. The sensor of claim 1, wherein the wire is initially tensioned from about ten pounds to about thirteen pounds between the attachment plate and the diaphragm.

25. The sensor of claim 1, wherein the wire includes a first portion within the interior that in turn includes a first portion end and a second portion end, wherein the first portion end is coupled to the attachment plate and the first portion of the wire is coupled in tension between the attachment plate at the first portion end and the diaphragm, and the second portion end is coupled to the attachment plate and the second portion of the wire also is coupled in tension between the attachment plate at the second portion end and the diaphragm.

26. The sensor of claim 25, further comprising:
a securing member extending from the diaphragm into the interior, the first portion of the wire tensioned between the attachment plate and the securing member.

27. The pressure sensor of claim 1, wherein the wire is a first wire and wherein the sensor further comprises
a second wire received through the second end, the second wire coupled to the attachment plate and configured in the interior, wherein the second wire is not tensioned between the attachment plate and the diaphragm such that the second wire exhibits a varying ultrasonic signal transmission characteristic as the temperature associated with the sensor changes, and wherein the second wire is coupled to the transmitting circuitry for use in measuring the temperature associated with the sensor based upon the varying ultrasonic signal transmission characteristic of the second wire.

28. The sensor of claim 27, wherein the first wire is configured to transmit a first ultrasonic signal generated by the transmitting circuitry and that is adaptable to be analyzed to determine a force on the diaphragm and wherein the second wire is configured to transmit a second ultrasonic signal generated by the transmitting circuitry and that is adaptable to be analyzed to determine the temperature associated with the sensor.

29. The sensor of claim 27, wherein the first wire and the second wire are configured to transmit the ultrasonic signal generated by the transmitting circuitry, the ultrasonic signal transmitted by the first wire adaptable to be analyzed to determine a force on the diaphragm and the ultrasonic signal transmitted by the second wire adapted to be analyzed to determine the temperature associated with the sensor.

30. The sensor of claim 1, wherein the wire is a first wire and wherein the sensor further comprises:
a second wire received through the second end that is not coupled in tension between the attachment plate and the diaphragm, wherein the second wire exhibits a varying resistance as a temperature associated with the sensor changes.

31. The sensor of claim 30, wherein the first wire is configured to transmit a first ultrasonic signal generated by the transmitting circuitry and that is adaptable to be analyzed to determine a force on the diaphragm and wherein a resistance of the second wire is adaptable to be analyzed to determine the temperature associated with the sensor.

32. The sensor of claim 1, wherein the wire includes a reflection point at an intermediate location along the length thereof to cause a reflection of an ultrasonic signal introduced to one end of the wire and that traverses the wire along the length thereof to the intermediate location is reflected back along its length to the end of the wire at which it was introduced.

33. The sensor of claim 32, wherein the reflection point comprises a physical deformation in the wire.

34. The sensor of claim 32, wherein the reflection point comprises a material having a different reflection property than the rest of the wire.

35. The sensor of claim 1, wherein the wire exhibits varying electrical resistance as a temperature associated with the sensor changes.

36. The sensor of claim 1, wherein the wire is a first wire, and the sensor further comprises:
a second wire operatively connected to the housing such that the second wire exhibits a varying ultrasonic signal transmission characteristic as the temperature associated with the housing changes, the second wire coupled to the transmitting circuitry for use in measuring the temperature associated with the housing based upon the varying ultrasonic signal transmission characteristic of the second wire.

37. The sensor of claim 1, wherein the wire is a first wire, and the sensor further comprises:
a second wire operatively connected to the housing such that the second wire exhibits a varying resistance as the temperature associated with the housing changes.

38. The sensor of claim 1, wherein the wire is a first wire, and the sensor further comprises:
a second wire operatively connected to the diaphragm such that the second wire exhibits a varying ultrasonic signal transmission characteristic as the temperature associated with the diaphragm changes, the second wire coupled to the transmitting circuitry for use in measuring the temperature associated with the diaphragm based upon the varying ultrasonic signal transmission characteristic of the second wire.

39. The sensor of claim 1, wherein the wire is a first wire, and the sensor further comprises:

a second wire operatively connected to the diaphragm such that the second wire exhibits a varying resistance as the temperature associated with the diaphragm changes.

40. The sensor of claim 1, further comprising a controller operatively coupled to the wire, the controller configured to determine the varying ultrasonic signal transmission characteristic of the wire and generate a pressure signal in response to the determined varying ultrasonic signal transmission characteristic.

41. The sensor of claim 1, wherein the wire comprises a metal, and wherein the ultrasonic signal is transmitted through the metal for sensing of the varying ultrasonic signal transmission characteristic.

42. The sensor of claim 1, wherein the wire comprises an alloy, and wherein the ultrasonic signal is transmitted through the alloy for sensing of the varying ultrasonic signal transmission characteristic.

43. The sensor of claim 42, wherein the alloy comprises steel, titanium, nickel-chromium, or any combination thereof.

44. The sensor of claim 1, wherein the wire, housing, and diaphragm are constructed of a single material.

45. A method of measuring a force with a sensor of the type that includes a housing having a first end and a second end, a diaphragm proximate the first end and coupled to the housing, an attachment plate coupled to the housing such that an interior is defined within the housing and between the diaphragm and the attachment plate, and a wire coupled in tension between the attachment plate and the diaphragm, the method comprising:
    transmitting an ultrasonic signal through the wire, wherein the ultrasonic signal comprises an ultrasonic mechanical wave; and
    measuring a force on the diaphragm of the sensor by sensing a sensed ultrasonic signal from the wire and determining a tension on the wire based upon a varying ultrasonic signal transmission characteristic of the sensed ultrasonic signal.

46. The method of claim 45, further comprising:
    generating the ultrasonic signal.

47. The method of claim 45, further comprising:
    determining a temperature associated with the sensor.

48. The method of claim 47, wherein the wire is a first wire and the varying ultrasonic signal transmission characteristic is a propagation time required for the transmitted ultrasonic signal to propagate through the first wire, and wherein the sensor further includes a second wire coupled to the attachment plate and configured in the interior, wherein the second wire is tensioned between the attachment plate and the diaphragm, and wherein determining the temperature associated with the sensor includes:
    measuring a temperature associated with the sensor by sensing a resistance of the second wire and determining the temperature based upon the sensed resistance.

49. The method of claim 47, wherein the wire is a first wire and the varying ultrasonic signal transmission characteristic is a propagation time required for the transmitted ultrasonic signal to propagate through the first wire, and wherein the sensor further includes a second wire coupled to the attachment plate and configured in the interior, wherein the second wire is not tensioned between the attachment plate and the diaphragm, and wherein determining the temperature associated with the sensor includes:
    measuring a temperature associated with the sensor by sensing an electrical resistance of the second wire and determining the temperature based upon the sensed electrical resistance.

50. The method of claim 47, wherein the wire is a first wire, the ultrasonic signal is a first ultrasonic signal, the transmitted ultrasonic signal is a first ultrasonic transmitted signal, the sensed ultrasonic signal is a first sensed ultrasonic signal, and the varying ultrasonic signal transmission characteristic is a first propagation time required for the first transmitted ultrasonic signal to propagate through the first wire, and wherein the sensor further includes a second wire configured at least partially around the housing, and wherein determining the temperature associated with the sensor includes:
    transmitting a second ultrasonic signal through the second wire;
    measuring a temperature associated with the housing by sensing the second transmitted ultrasonic signal from the second wire and determining the temperature based upon a second propagation time required for the second transmitted ultrasonic signal to propagate through the second wire.

51. The method of claim 47, wherein determining the temperature associated with the sensor includes:
    sensing an electrical resistance of the wire and determining a temperature associated with the sensor based upon the electrical resistance of the wire.

52. The method of claim 47, wherein the sensor further includes a thermocouple, and wherein determining the temperature associated with the sensor includes:
    sensing a voltage of a signal generated by the thermocouple and determining a temperature associated with the sensor based upon the voltage of the signal generated by the thermocouple.

53. The method of claim 47, further comprising:
    determining a compensated force on the diaphragm of the sensor based on the temperature associated with the sensor.

54. The method of claim 45, wherein the varying ultrasonic signal transmission characteristic of the sensed ultrasonic signal is a phase of the sensed ultrasonic signal, the method further comprising:
    determining a phase shift from the phase of the sensed ultrasonic signal and a phase of the transmitted ultrasonic signal; and
    calculating the force on the diaphragm based upon the phase shift.

55. The method of claim 45, further comprising:
    determining the force on the diaphragm based upon the tension in the wire.

56. The method of claim 45, wherein the wire includes a reflection point at an intermediate location along the length thereof, the method further comprising:
    measuring a temperature associated with the sensor by sensing a reflected ultrasonic signal reflected from the intermediate location and determining the temperature associated with the sensor by determining a phase shift between the phase of the reflected ultrasonic signal and a phase of the transmitted ultrasonic signal.

57. The method of claim 45, wherein a frequency of the ultrasonic signal is between approximately 100 KHz and 10 MHz.

58. The method of claim 45, further comprising:
    determining a pressure associated with the sensor based on the force on the diaphragm.

59. A method of measuring a force with a sensor of a type that includes a housing having a first end and a second end, a diaphragm proximate the first end and coupled to the housing, an attachment plate coupled to the housing such that an interior is defined within the housing and between the diaphragm and the attachment plate, and a wire coupled in tension between the attachment plate and the diaphragm, the method comprising:
- generating an ultrasonic signal at transmitting circuitry coupled to the wire;
- transmitting the ultrasonic signal through the wire as an ultrasonic mechanical wave with the transmitting circuitry;
- measuring the force on the diaphragm of the sensor by sensing the ultrasonic signal from the wire and determining a tension on the wire based upon a varying ultrasonic signal transmission characteristic of the sensed ultrasonic signal.

60. The method of claim 59, wherein a frequency of the ultrasonic signal is between approximately 100 KHz and 10 MHz.

61. A sensor comprising:
- a housing having a first end and a second end;
- a diaphragm proximate the first end and coupled to the housing;
- an attachment plate coupled to the housing such that an interior is defined within the housing and between the diaphragm and the attachment plate;
- transmitting circuitry configured to generate an ultrasonic signal, the ultrasonic signal comprising an ultrasonic mechanical wave; and
- a wire coupled in tension between the attachment plate and the diaphragm such that the wire exhibits a varying ultrasonic signal transmission characteristic as the tension between the attachment plate and the diaphragm changes, wherein the wire comprises a metal or alloy coupled to receive the ultrasonic signal generated by the transmitting circuitry for use in measuring an environmental condition based on the varying ultrasonic signal transmission characteristic.

62. The sensor of claim 61, wherein the housing, diaphragm, and wire are constructed of a single material.

63. The sensor of claim 61, wherein the wire comprises steel, titanium, nickel-chromium, or any combination thereof.

64. A method of measuring a force with a sensor of a type that includes a housing having a first end and a second end, a diaphragm proximate the first end and coupled to the housing, an attachment plate coupled to the housing such that an interior is defined within the housing and between the diaphragm and the attachment plate, and a wire comprising metal or alloy and coupled in tension between the attachment plate and the diaphragm, the method comprising:
- transmitting an ultrasonic signal through the wire, wherein the ultrasonic signal comprises an ultrasonic mechanical wave; and
- measuring the force on the diaphragm of the sensor by sensing a sensed ultrasonic signal from the wire and determining a tension on the wire based upon a varying ultrasonic signal transmission characteristic of the sensed ultrasonic signal.

65. The method of claim 64, wherein a frequency of the ultrasonic signal is between approximately 100 KHz and 10 MHz.

66. A sensor comprising:
- a housing having a first end and a second end;
- a diaphragm proximate the first end and coupled to the housing;
- an attachment plate coupled to the housing such that an interior is defined within the housing and between the diaphragm and the attachment plate;
- a wire coupled in tension between the attachment plate and the diaphragm such that the wire exhibits a varying ultrasonic signal transmission characteristic as the tension between the attachment plate and the diaphragm changes; and
- transmitting circuitry coupled to the wire and configured to generate an ultrasonic signal for transmission through the wire as an ultrasonic mechanical wave.

67. The sensor of claim 66, wherein the transmitting circuitry is configured to generate the ultrasonic signal for transmission at a frequency between approximately 100 KHz and 10 MHz.

* * * * *